US009299364B1

United States Patent
Pereira et al.

(10) Patent No.: US 9,299,364 B1
(45) Date of Patent: Mar. 29, 2016

(54) AUDIO CONTENT FINGERPRINTING BASED ON TWO-DIMENSIONAL CONSTANT Q-FACTOR TRANSFORM REPRESENTATION AND ROBUST AUDIO IDENTIFICATION FOR TIME-ALIGNED APPLICATIONS

(71) Applicants: Jose Pio Pereira, Cupertino, CA (US); Mihailo M. Stojancic, San Jose, CA (US); Peter Wendt, San Jose, CA (US)

(72) Inventors: Jose Pio Pereira, Cupertino, CA (US); Mihailo M. Stojancic, San Jose, CA (US); Peter Wendt, San Jose, CA (US)

(73) Assignee: Gracenote, Inc., Emeryville, CA (US)

( * ) Notice: Subject to any disclaimer, the term of this patent is extended or adjusted under 35 U.S.C. 154(b) by 727 days.

(21) Appl. No.: 13/647,996

(22) Filed: Oct. 9, 2012

Related U.S. Application Data

(60) Provisional application No. 61/544,035, filed on Oct. 6, 2011, provisional application No. 61/543,943, filed on Oct. 6, 2011.

(51) Int. Cl.
*G06F 17/00* (2006.01)
*G10L 25/51* (2013.01)
*G10L 19/018* (2013.01)

(52) U.S. Cl.
CPC .............. *G10L 25/51* (2013.01); *G10L 19/018* (2013.01)

(58) Field of Classification Search
None
See application file for complete search history.

(56) References Cited

U.S. PATENT DOCUMENTS

| | | | |
|---|---|---|---|
| 2009/0100990 A1* | 4/2009 | Cremer et al. | 84/623 |
| 2011/0078172 A1* | 3/2011 | LaJoie et al. | 707/769 |
| 2011/0173208 A1* | 7/2011 | Vogel | 707/746 |
| 2014/0310006 A1* | 10/2014 | Anguera Miro | G10L 25/48 704/500 |

* cited by examiner

*Primary Examiner* — Fan Tsang
*Assistant Examiner* — David Siegel
(74) *Attorney, Agent, or Firm* — Hultquist PLLC; Peter H. Priest

(57) ABSTRACT

Content identification methods for consumer devices determine robust audio fingerprints that are resilient to audio distortions. One method generates signatures representing audio content based on a constant Q-factor transform (CQT). A 2D spectral representation of a 1D audio signal facilitates generation of region based signatures within frequency octaves and across the entire 2D signal representation. Also, points of interest are detected within the 2D audio signal representation and interest regions are determined around selected points of interest. Another method generates audio descriptors using an accumulating filter function on bands of the audio spectrum and generates audio transform coefficients. A response of each spectral band is computed and transform coefficients are determined by filtering, by accumulating derivatives with different lags, and computing second order derivatives. Additionally, time and frequency based onset detection determines audio descriptors at events and enhances descriptors with information related to an event.

25 Claims, 21 Drawing Sheets

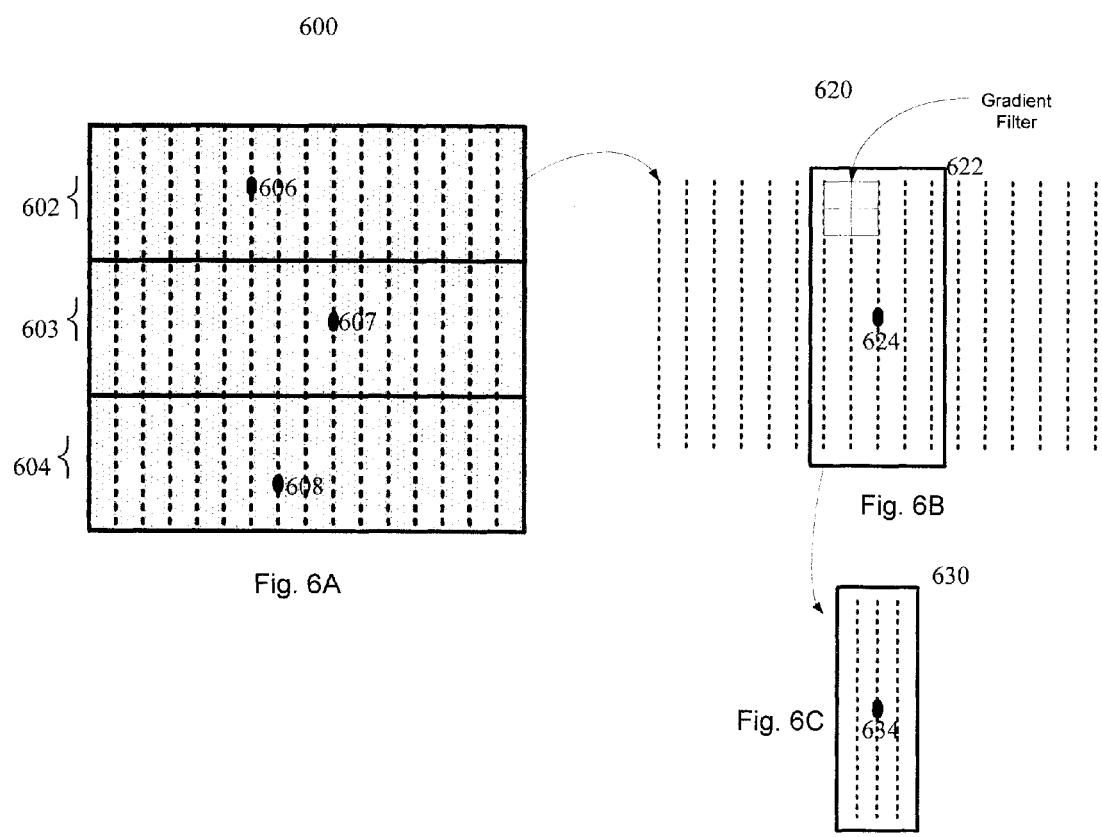

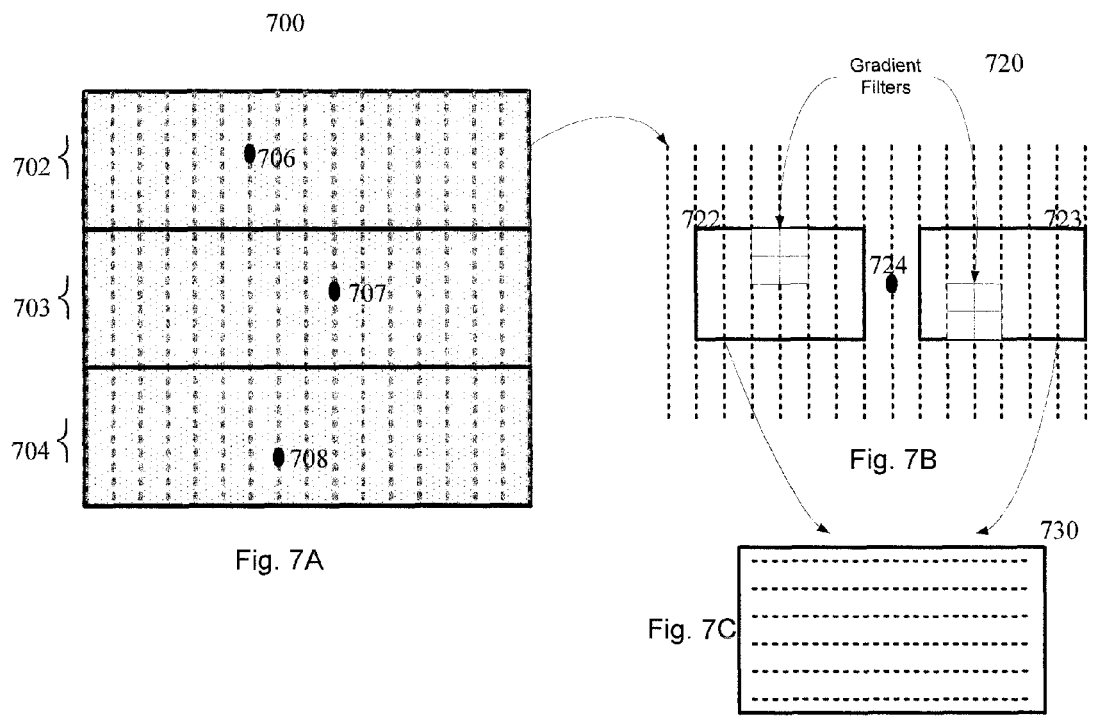
Fig. 7A
Fig. 7B
Fig. 7C
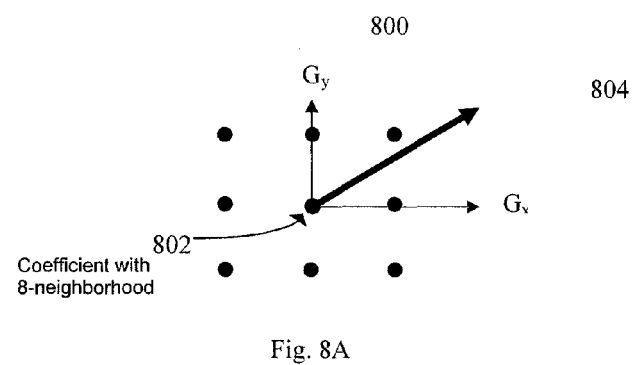
Fig. 8A

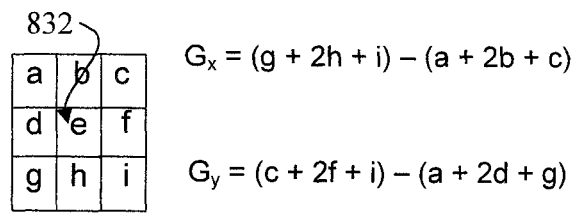
Fig. 8B
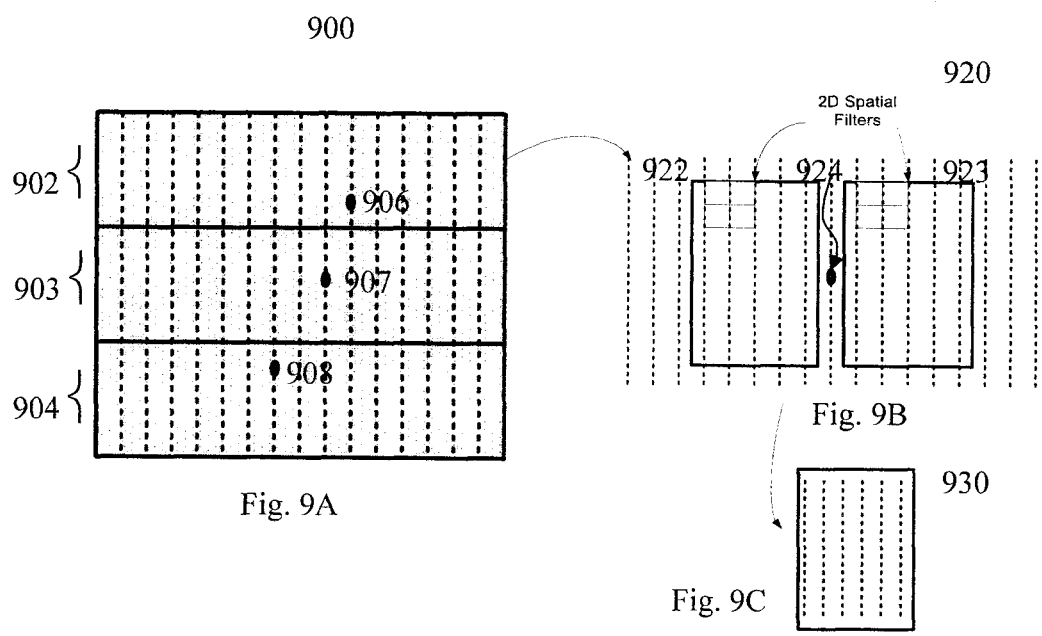
Fig. 9A
Fig. 9B
Fig. 9C

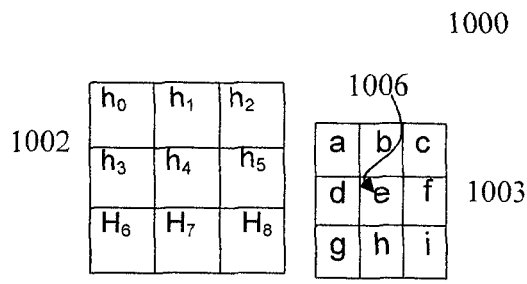
$R_e = ah_0 + bh_1 + ch_2 + dh_3 + eh_4 + fh_5 + gh_6 + hh_7 + ih_8$
Fig. 10
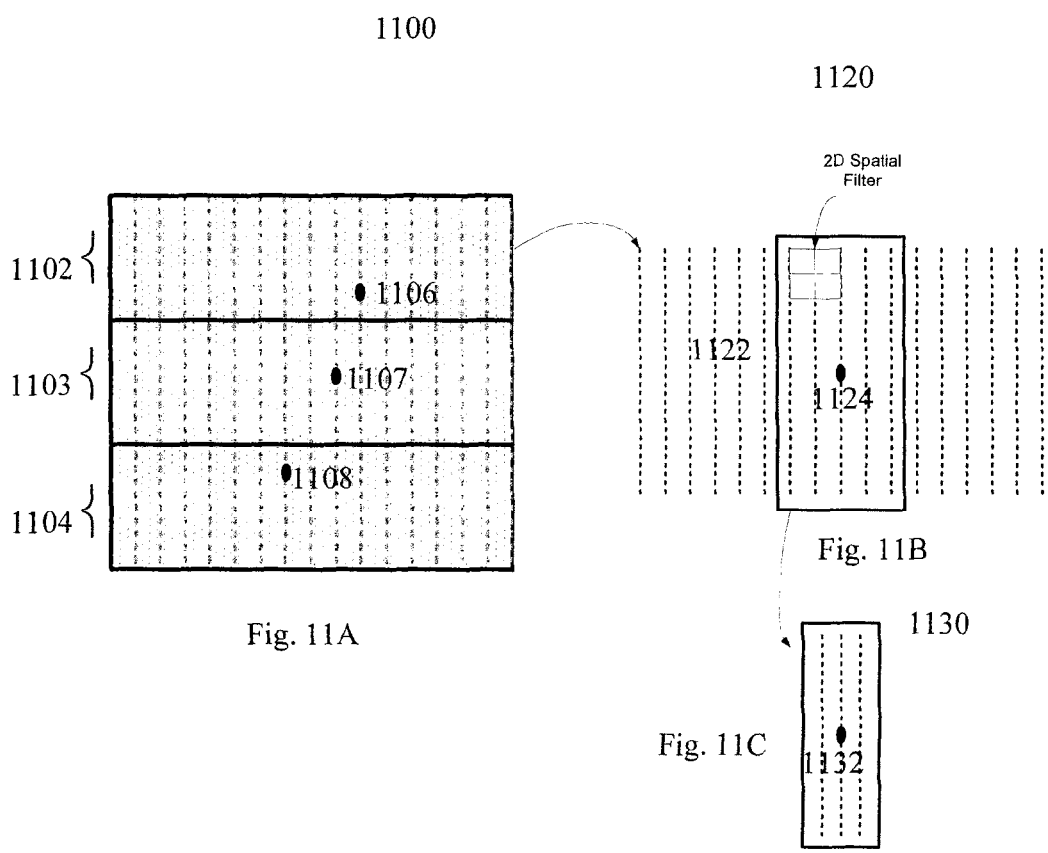
Fig. 11A
Fig. 11B
Fig. 11C Interest Point (peak position within a selected region of interest)
1202

1800

| 30b Coeff | 30b Band | 1801

Binary audio signature

| 4b Band1 ID | 4b Coeff1 ID | 4b Coeff2 ID | 4b Band2 ID | 1802

Associated data per audio signature

| 4b Band1 ID2 | 4b Coeff1 ID2 | 4b Coeff2 ID2 | 4b Band2 ID2 | 1803

Additional Associated data per audio signature for fuzzy search

| 16b Coeff | 4b Coeff1 ID | 4b Band ID | 4b Coeff2 ID | 1804

Index lookup key

| 12b Coeff | 4b Coeff1 ID | 4b Band ID | 4b Coeff2 ID | 1901

Initial Index lookup key

| 12b Coeff | 4b Coeff1 ID | 4b Band ID2 | 4b Coeff2 ID | 1902

Index lookup key with a first alternative combination for fuzzy search

| 12b Coeff | 4b Coeff1 ID2 | 4b Band ID3 | 4b Coeff2 ID | 1903

Index lookup key with a second alternative combination for fuzzy search

Fig.19

AUDIO CONTENT FINGERPRINTING BASED ON TWO-DIMENSIONAL CONSTANT Q-FACTOR TRANSFORM REPRESENTATION AND ROBUST AUDIO IDENTIFICATION FOR TIME-ALIGNED APPLICATIONS

CROSS REFERENCE TO RELATED APPLICATIONS

The present application claims the benefit of U.S. Provisional Patent Application No. 61/544,035 entitled "Audio Content Fingerprinting Based on Two-Dimensional Constant Q-Factor Transform Representation", filed on Oct. 6, 2011 and U.S. Provisional Patent Application No. 61/543,943 entitled "Robust Audio Identification and Time-Aligned Applications", filed Oct. 6, 2011 which are hereby incorporated by reference in their entirety.

U.S. application Ser. No. 12/141,163 filed on Jun. 18, 2008 entitled "Methods and Apparatus for Providing a Scalable Identification of Digital Video Sequences" now issued as U.S. Pat. No. 8,229,227; U.S. application Ser. No. 12/141,337 filed on Jun. 18, 2008 entitled "Method and Apparatus for Multi-Dimensional Content Search and Video Identification" now issued as U.S. Pat. No. 8,171,030; U.S. application Ser. No. 12/788,796 filed on May 24, 2010 entitled "Multi-Media Content Identification Using Multi-Level Content Signature Correlation and Fast Similarity Search"; U.S. application Ser. No. 12/772,566 filed on May 3, 2010 entitled "Media Fingerprinting and Identification System" now issued as U.S. Pat. No. 8,195,689; and U.S. application Ser. No. 12/612,729 filed on Nov. 5, 2009 entitled "Digital Video Content Fingerprinting Based on Scale Invariant Interest Region Detection with an Array of Anisotropic Filters" now issued as U.S. Pat. No. 8,189,945 and having the same assignee as the present application are related applications and hereby incorporated by reference in their entirety.

FIELD OF THE INVENTION

The present invention relates generally to improvements in audio processing architectures and methods for feature extraction from a digital audio sequence. More particularly, the present invention addresses methods for audio sequence structuring, time-frequency (scale-space) domain characterization and feature detection, and efficient signature generation for audio content representation in audio-video content recognition applications.

The present invention also generally relates to information retrieval, audio fingerprinting for identification and tracking, and time-aligned broadcast applications.

BACKGROUND OF THE INVENTION

Over the past few years, several methods for audio feature extraction and signature generation have been proposed. In general, the problem of mapping high-dimensional audio input data into lower-dimensional feature vectors containing sufficient relevant information is a difficult problem and at the core of audio fingerprinting and identification systems.

One class of methods reduces high dimensionality audio information by a distortion discriminant analysis (DDA), where each layer of DDA projects its input into directions in an attempt to maximize a signal-to-noise ratio for a given set of distortions.

Toward a similar goal, high input dimensionality may be reduced by a projection of the audio spectrogram onto a random basis vector. Such a projection permits generation of a compact bit vector representing each overlapping time window of the audio signal.

Also, compact signatures representing audio content may be based on Mel Frequency Cepstral Coefficients (MFCC) with various schemes used for descriptor coefficient quantization, selection, and signature generation. MFCC parametric spectral representation facilitates generation of descriptor parameters independent of the number of filter bands while the quantization of descriptor coefficients and subsequent selection provide precise bitwise signature generation.

Other methods which may be used are based on one-dimensional wavelet transform coefficients, or on the sign of energy differences, simultaneously along time and frequency axes in an overlapping audio sample time window spectrogram.

A number of applications treat the whole audio spectrogram as a pattern and extract signatures based on temporal evolution of the audio spectrum analyzed with Haar-Wavelet types of filters at multiple scales.

Providing robust audio identification, in presence of significant ambient and interfering sounds, and tracking of identified content in order to bring various applications directly to smart phones and mobile devices such as tablets is a difficult problem.

SUMMARY OF THE INVENTION

In one or more of its several embodiments, the invention addresses problems such as those outlined in the previous section. One embodiment of the invention addresses a method for robust fingerprinting of audio signals in a processor. A received one dimensional (1D) audio signal is structured into overlapping audio frames. A constant Q-factor transform (CQT) is applied to the overlapping audio frames to generate a two dimensional (2D) CQT data structure representation of the audio frames. Octaves of the 2D CQT data structure are processed to determine regions of interest within the 2D CQT data structure and peak interest points within selected interest regions. Multidimensional descriptors are generated in windows around the peak interest points. A quantizer threshold is applied to the multidimensional descriptors to generate audio signatures representing the received 1D audio signal.

Another embodiment addresses a method to generate audio signatures in a processor. A one dimensional (1D) audio signal is received that has been filtered to reduce noise and organized into weighted frames. A constant Q-factor transform (CQT) is applied to the weighted frames to generate a two dimensional (2D) scale-space representation of the 1D audio signal. The 2D scale-space representation is processed to determine interest regions and peak interest points within selected interest regions. Multidimensional descriptors are generated for the selected interest regions. A quantizer is applied to the multidimensional descriptors to generate a first set of audio signatures. Side information is combined with the signatures of the first set of audio signatures to generate a processed set of audio signatures representing the received 1 D audio signal.

Another embodiment addresses a method for audio identification in a processor that is robust to interfering noise. A filtering function is applied to spectral components of a one dimensional (1D) audio signal to accumulate energy of spectral bands of the 1D audio signal. Audio query signatures are generated from measurements of the accumulated energy of spectral bands. Audio query signatures and unique features are correlated with reference audio signatures and features.

Another embodiment addresses a computer readable non-transitory medium encoded with computer readable program data and code, the program data and code operates to execute the following steps. Structure a received one dimensional (1D) audio signal into overlapping audio frames. Apply a constant Q-factor transform (CQT) to the overlapping audio frames to generate a two dimensional (2D) CQT data structure of the audio frames. Process octaves of the 2D CQT data structure to determine regions of interest within the 2D CQT data structure and peak interest points within selected interest regions. Generate multidimensional descriptors in windows around the peak interest points. Apply a quantizer threshold to the multidimensional descriptors to generate audio signatures representing the receive 1D audio signal.

A more complete understanding of the present invention, as well as further features and advantages of the invention, will be apparent from the following Detailed Description and the accompanying drawings.

BRIEF DESCRIPTION OF THE DRAWINGS

FIG. 6A illustrates a region within an octave with three sub-regions used to determine a peak interest point for each sub-region;

FIG. 6B illustrates an exemplary vertical rectangular descriptor box, centered at an interest point detected for a sub-region, extending across the octave, with a gradient filter applied in raster fashion;

FIG. 6C illustrates a descriptor coefficient matrix obtained after a gradient filter has been applied on all selected coefficients from the region around detected interest point;

FIG. 7A illustrates a region within an octave with three sub-regions used to determine a peak interest point for each sub-region;

FIG. 7B illustrates an exemplary horizontally drawn rectangular descriptor box, centered at an interest point detected for a sub-region, with a gradient filter applied in raster fashion;

FIG. 7C illustrates a descriptor coefficient matrix obtained after gradient filter has been applied on all selected coefficients from the two regions around detected interest point, not including the interest point;

FIG. 8A illustrates a coefficient intensity gradient vector;

FIG. 8B illustrates a 2D gradient filter matrix;

FIG. 9A illustrates a region within an octave with three sub-regions used to determine a peak interest point for each sub-region;

FIG. 9B illustrates exemplary rectangular descriptor boxes, centered at an interest point detected for a sub-region, with a 2D spatial filter applied in raster fashion;

FIG. 9C illustrates a descriptor coefficient matrix obtained after the 2D spatial filter has been applied on all selected coefficients from the two regions around detected interest point, not including the interest point;

FIG. 10 illustrates an example of a 3×3 2D spatial filter with coefficients h0-h8, and a 3×3 coefficient area;

FIG. 11A illustrates a region within an octave with three sub-regions used to determine a peak interest point for each sub-region;

FIG. 11B illustrates an exemplary vertical rectangular descriptor box, centered at an interest point detected for a sub-region, extending across the octave, with a 2D spatial filter applied in raster fashion;

FIG. 11C illustrates a descriptor coefficient matrix obtained after the 2D spatial filter has been applied on all selected coefficients from the region around detected interest point;

FIG. 18 illustrates an audio fingerprint with various components such as index hash key, signature, associated data;

FIG. 19 illustrates hash key alternatives for use in a fuzzy search method for database access;

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-readable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable non-transitory medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
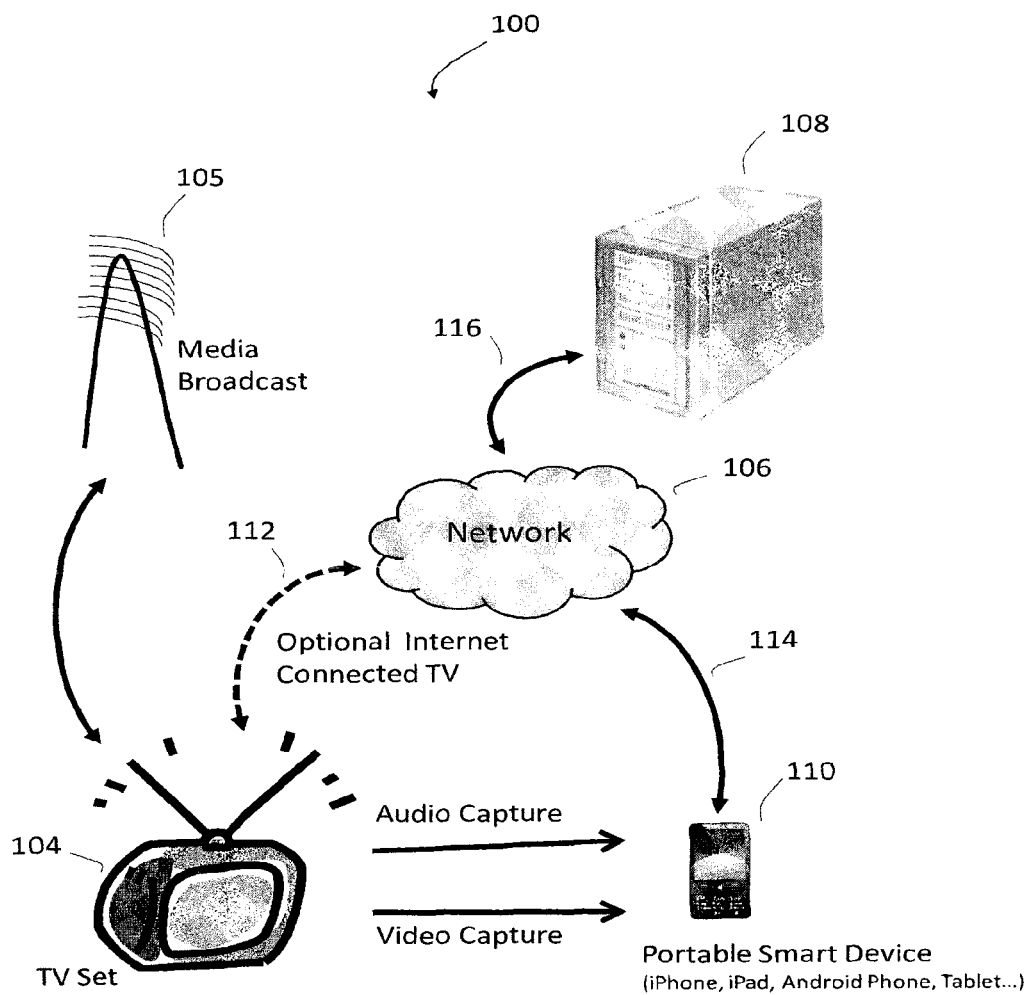
FIG. 1 illustrates a typical synchronous mobile application using audio fingerprinting as an underlying technology.

FIG. 1 illustrates a system 100 for providing mobile device applications in accordance with the present invention based on analysis of audio, video, or audio and video signals acquired from a media presentation device. The input of audio, video, or audio and video signals hereinafter is referred to as media content. One embodiment addresses a method to identify media content, by acquiring media content on a mobile device from a media presentation device, appropriately processing the media content, fingerprinting the media content, and searching fingerprint databases to identify the media content. The system 100 includes a media presentation device 104, such as a television set, a desktop, laptop, or tablet computer, a digital video disc (DVD) player, or a smartphone device configured to display television programming or play audio media such as wireless received radio signals, compact discs (CDs), or the like. The media presentation device, such as a television set, may be connected to a remote media broadcast system 105 for receiving television programming content. Also, the media presentation device 104 may or may not be connected to the Internet 106. The system 100 also includes a remote content identification system 108 and a mobile device 110 connected over the Internet 106 to the remote content identification system 108. Connections 112, 114, and 116 may be wired or cabled connections, wireless connections, or a combination of wire cable and wireless connections. For example, the mobile device 110 may connect wirelessly to the Internet 106 through a wireless router or over 3G or 4G networks while the remote content identification system 108 may be wire or cable attached through a modem to the Internet 106. The mobile device 110 may be configured to acquire audio signals from the media presentation device 104 by use of a microphone. The mobile device 110 may also be configured to acquire images or a video from the media presentation device 104 by use of a charge coupled device (CCD) image sensor and a camera lens assembly included in the mobile device 110.

Illustrated system 100 supports applications on the mobile device 110 that operate in real time and in accordance with television or other media programming content that is being presented on a media presentation device 104 and received by the mobile device 110.

The mobile device 110 is configured to acquire a temporal fragment of media content, including audio content, video content, or both, that are playing on the media presentation device 104, using the mobile device's microphone, camera, or both, and generates query fingerprints of the temporal fragment of the acquired media content, as described herein. A chunk of the query fingerprints, which is a set of the query fingerprints corresponding to a time segment of the query audio signal, or a digest of the chunk of the query fingerprints are transmitted as a search query to the remote content identification system 108, also referred to as a remote search server 108, for content identification. A digest of the query fingerprints is a summarization of the fingerprints generated for the acquired media content. If the search query is found in a reference database of the search server 108, the search server 108 responds with a title and timing information of the identified media content, along with related metadata, and sends the title, the timing information, and the related metadata to the mobile device 110. The original chunk of query reference fingerprints or the digest of the query fingerprints is stored on the mobile device 110 for further use in querying a mobile device database located on the mobile device 110 and tracking of media content. The mobile device 110 may be configured to continuously listen, observe, or listen and observe the media programming content. If a change in the media programming content is detected, the mobile device 110 generates one or more new queries that are sent to the remote search server 108 for content identification. If the new query is found in the reference database of the remote search server 108, the search server 108 responds with a title and timing of the media content associated with the new query, along with related metadata, and sends the identified information to the mobile device 110. The original new chunk of reference fingerprints are stored on the mobile device 110 for further use in querying and tracking operations locally on the mobile device 110. This process continues as long as the mobile device 110 is listening, or observing, or both to the media programming content. The mobile device 110 may be equipped with an actionable program event detection system, which generates an action signal upon detection of a particular audio, or video, or audio and video fragment stored in the reference fingerprint database. A software application running on the mobile device 110 can then perform actions based on local search results, presenting to the user a variety of additional information on the same mobile device 110 in real time while the remote media programming is still playing the associated media content.

FIG. 1 also illustrates a typical synchronous mobile application where audio fingerprinting is used as an underlying technology. In the system example a method is presented to enable applications on a mobile phone to act synchronously to programming content that is being presented on a nearby located television device. In one embodiment, the user first captures some temporal fragment of the audio content on their mobile device using the device's microphone. For example, a movie that started at 9 PM is being watched on a television set 104. A user enables an application on a mobile device 110, such as a smartphone, that configures the smartphone 110 to acquire a fragment of media content, which may include a fragment of audio content, a fragment of video content, or fragments of both audio and video content. For example, an audio fragment may be ten seconds of background music from a scene in the movie.

The application generates query fingerprints for the acquired fragment of media content as described in further detail below. The application transmits the query fingerprints as a search query to a remote search server 108 which searches for the transmitted content in a reference database of the remote search server 108. If media content associated with the query fingerprints is discovered, the remote search server 108 retrieves related content, such as a title of the media content, timing information and identifies other related information which the user may have previously requested and forwards the related content and associated information to the user's smartphone 110 for presentation to the user. At this point, the television programming is tracked in real time and preprogrammed events are identified, such as a change in television program, or onset of a selected type of commercial, or entrance of a particular character, with sub-second resolution and to trigger a notification action to alert the user.

As used herein, an audio fingerprint is a calculated numerical value, alternatively termed a signature, which represents a prominent feature of an audio frame. A collection of signatures drawn from an audio frame generates a compact audio frame representation, while a collection of signatures associated with each audio frame in an audio sequence with multiple frames forms audio sequence representation. The same definition applies to a video signal and a video fingerprint.

The decoded audio content is fingerprinted by an audio fingerprinting system. The fingerprint content is transmitted to a search server, which, if the content is found in the database, responds with the title and timing of the video content, along with related metadata. A software application running on the mobile device can then perform actions based on the received data. The simplest application is to present this information to the user on their mobile device. Other examples include allowing the user to "check-in" to the detected video content, or presenting the user with advertisements or coupons related to the video content. In another embodiment, the temporal fragment of the audio content is directly captured by the television device or another device directly connected to the television or having access to the source content. A communication channel is established between this capturing device and the user's mobile device. The decoded audio contents are fingerprinted on the capturing device, the fingerprint content is transmitted to a search server, and the search result delivered to the user's mobile device. A software application running on the mobile device can then perform actions based on the received data. The capturing device may also be equipped with an actionable program event detection system, which generates action data upon detection of a particular audio fragment stored in the reference fingerprint database. Where a TV set is equipped with an actionable program event detection system, the desired action data are transmitted from the TV to a mobile device which then responds with a variety of additional information presented to the user on the same mobile device synchronously with the remote TV programming.

The description herein for time-frequency audio sequence analysis, feature extraction and descriptor/signature generation is presented by way of an example. However, the method is general with respect to the initial time-frequency analysis, transform selection, and descriptor/signature generation methods.

Figure 2A:
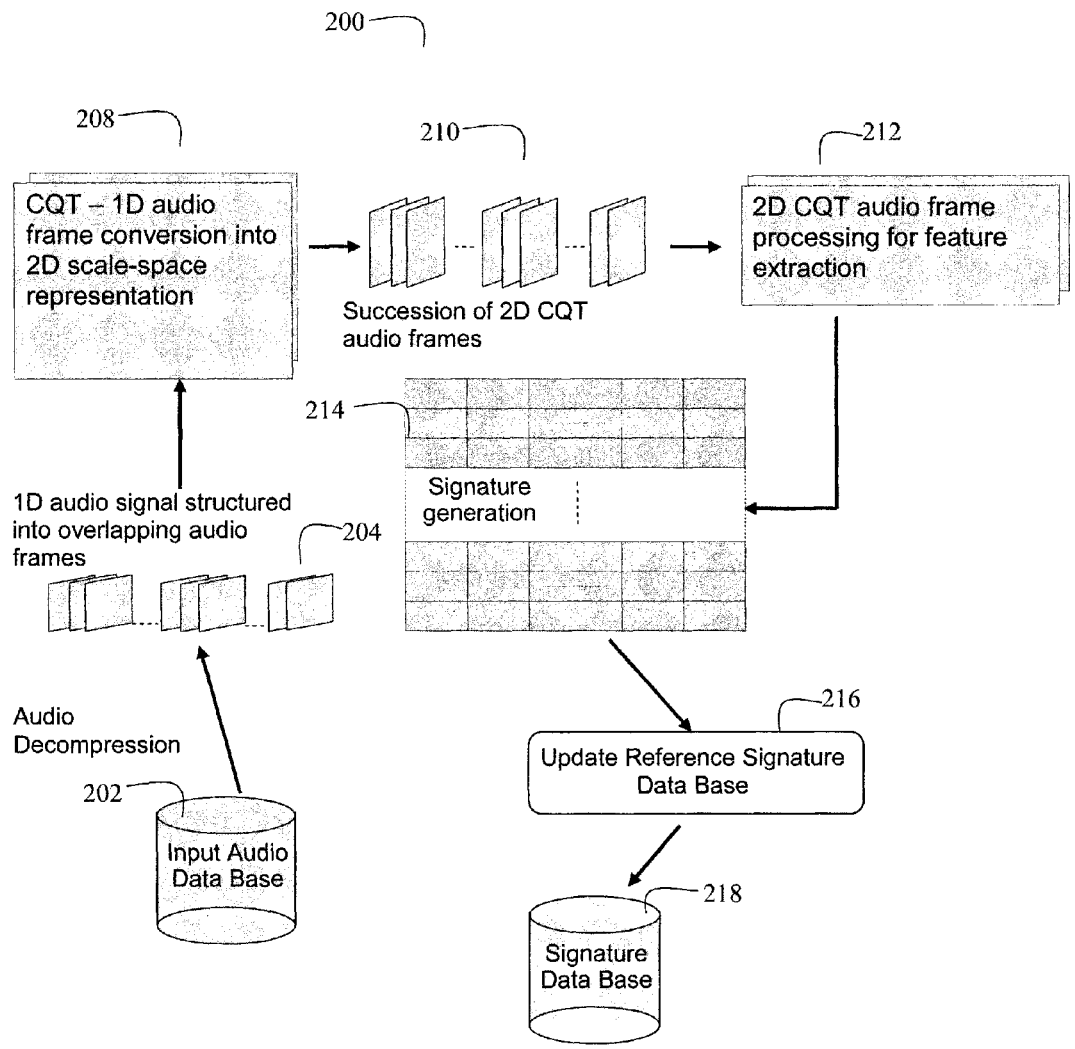
FIG. 2A illustrates an example process of audio fingerprinting, fingerprint data base formation, and querying.

FIG. 2A illustrates an exemplary process 200 audio fingerprinting, fingerprint database formation and search. For use herein, an audio sequence is defined as a sequence of selected time periods of an audio signal, such as a sequence of ten second time window and may also be referred to as a sequence of ten second audio frames. As shown in FIG. 2, the basic functionality of a audio signature database formation consists of selecting from a one dimensional (1D) audio signal a sequence of overlapping audio frames in step 204 from an audio input database in access step 202, and processing the audio frames in a series of process steps 208, 212, and 214 as follows. At step 208, the 1D audio frames are transformed into a two dimensional (2D) scale-space representation, as described in more detail below. At step 210, the 2D scale-space representation of each audio frame is passed to the next processing step. At step 212, the frames are processed according to a 2D constant Q-factor transform (CQT) for feature extraction, as described in further detail below with regard to step 308 in FIG. 3 and step 1406 in FIG. 14. A signature generation process step 214 derives multi-dimensional audio signatures, audio fingerprints, of compact size, as described in more detail below with regard to signature generation flowchart 1400 of FIG. 14. An update process step 216 is utilized to insert a set of compact signatures into the signature database in access step 218 to be used for audio sequence search and identification.

As the output of the above processing, a number of results are presented including the count of similar audio content found, the count of not identified audio content, statistics with respect to precise timing of matching audio reference frames, and the confidence factors associated with each identified audio content.

A similar process is followed in an audio content search and identification process. Frames of an audio signal to be identified are provided, for example, from an input audio database in access step 202 and processed in a series of process steps 204, 208, 212, and 214. A query process determines audio content which closely matching the original set of input audio frames.

A number of audio frames selected from the input audio signal as described in the above section on frame selection step 204, are processed according to steps 208, 210, and 212 in order to generate a set of spatial signatures in step 214 of FIG. 2. The set of spatial signatures include, but are not limited to, signatures derived by transforming the 1D audio signal into a 2D transformed representation using CQT techniques from which 2D feature extraction methods are used as described in more detail below.

A constant Q-factor transform (CQT) algorithmic structure may be used for distributed speech recognition, where CQT coefficients, descriptors, and signatures are generated on a mobile device and then transmitted to a server that provides audio and voice recognition. Such an approach may also be used in a music-matching scenario, where CQT based audio fingerprints are used to match or distinguish audio files or streams without analyzing the audio for a particular word or musical note recognition.

One embodiment of the invention addresses a method for improving the accuracy and speed of audio fingerprinting by using content-based audio feature extraction and signature generation. Audio features, representing the underlying content, are extracted by using a CQT 2D algorithmic structure, and then efficient, compact, descriptors and bit-wise signatures representing audio signal are generated.

In a CQT algorithmic structure input audio samples are divided into overlapping frames, and subsequently each frame is transformed into a two dimensional (2D), multi resolution, scale-space representation, which is equivalent to a time-frequency representation. The scale-space audio signal representation is used for audio feature extraction and descriptor generation. Based on selected coefficient formations of a 2D, multi resolution, scale-space audio signal representation, descriptors comprising a plurality of descriptor coefficients are derived. The descriptors are transformed, by application of a discrete cosine transform (DCT) in one embodiment, or application of a gradient method in a second embodiment, or by use of a filtering process in a third embodiment, for each audio frame and then are subsequently used for signature generation. In another embodiment, a quantization process is used to convert the transformed descriptor coefficients into signatures that are integer values for storage, transmission, and matching operations. Each descriptor coefficient is also referred to as a descriptor dimension. Ranges of different transformed descriptor coefficients are evaluated to determine a quantizer or multiple quantizers with variable dynamic range. The variable dynamic range quantizers are applied at a number of levels for each descriptor coefficient to generate audio signatures. Audio signatures derived in the way described above lend themselves well to robust audio identification with sufficiently distinct signatures and at a low bit rate.

Generally, short time windows are needed for a transform of an audio signal to retain high quality audio coding at higher frequencies, whereas longer time windows with higher frequency resolution of an audio signal is required to carry out coding at low frequencies. What is desired is an analysis technique having a frequency resolution that varies according to the received audio signal, providing improved resolution across a 20 hz to 20 khz audio range. Conventional discrete Fourier transform (DFT) has linearly spaced frequency bins and therefore cannot satisfy a time and frequency resolution variation requirements over the wide range of audible frequencies from 20 hz to 20 khz. To address such a problem, a constant-Q transform technique is used that transforms a time-domain signal x(n), such as an audio signal, into a 2D time-frequency domain, also referred to as a scale-space domain, so that center frequencies of DFT frequency bins are geometrically spaced and their Q-factors, which are ratios of the center frequencies to bandwidths, are constant. Contrary to the conventional DFT, CQT's time resolution varies for different frequency bins such that frequency resolution is better for low frequencies and the time resolution is better for high frequencies.

Although CQT can be viewed as a wavelet transform, there are considerable differences. Wavelet transforms are mostly focused on critically sampled dyadic wavelet functions, where the frequency resolution is only one bin per octave. Recently, another technique that uses perfect reconstruction wavelet transforms has been proposed that has rational dilation factors, which indicates that the center frequencies of the bins are spaced by p/q, where p and q are integer values. However, these p and q integer values are based on iterated filter banks and are therefore less attractive computationally when higher Q-factors are considered.

An efficient technique for computing constant-Q transforms with high Q factors is based on a fast Fourier transform (FFT) and frequency-domain kernel functions. For example, see the paper "Constant-Q Transform Toolbox for Music Processing", by Christian Schörkhuber and Anssi Klapuri in Proc. 7$^{th}$ Sound and Music Conference (SMC-2010), 2010, with regard to step 308 in FIG. 3 and step 1406 in FIG. 14. The CQT transform $X^{cq}(k, n)$ of a discrete time-domain signal x(n) is defined as:

$$X^{cq}(k,n)=\sum_{j=n-\lfloor N_k/2 \rfloor}^{n+\lfloor N_k/2 \rfloor} x(j)a^*_k(j-n+N_k/2) \quad (1)$$

where k=1, 2, . . . K indexes the frequency bins of the CQT, $\lfloor N_k/2 \rfloor$ represents a floor function, and $a^*_k(n)$ denotes the complex conjugate of $a_k(n)$ and basis functions $a_k(n)$ represent complex-valued waveforms. A Q-factor bin k is defined by:

$$Q_k \equiv \frac{f_k}{\Delta f_k} = N_k f_k / \Delta \omega f_s \quad (2)$$

where $f_k$ is the center frequency of bin k, $\Delta f_k$ represents the −3 dB bandwidth of the frequency response of the basis functions $a_k(n)$, $f_s$ represents the sampling rate, $N_k$ is a window length, representative of a number of audio samples, and $\Delta\omega$ is a −3 dB bandwidth of a main lobe of a spectrum of a window function w(t). The window lengths $N_k$ are chosen to be inversely proportional to $f_k$ to have the same Q-factor for all of the bins k. For example, the center frequencies of the CQT described here are $f_k=f_1\,2^{k-1/B}$ where the center frequency of the lowest-frequency bin is $f_1$ and the number of bins per octave is determined by B.

The Q factors $Q_k$ are defined to be the same for all bins, which allows $Q_k$ to be renamed to Q. Generally, Q is made as large as possible which allows the bandwidth $\Delta f_k$ of each bin to be as small as possible to minimize frequency smearing. A value of Q which has minimal frequency smearing and allows signal reconstruction is:

$$Q = \frac{q}{\Delta\omega(2^{1/B}-1)} \quad (3)$$

where q is a scaling factor governed by $0<q\leq 1$. Solving for $N_k$ in equation 2 results in:

$$N_k = \frac{qf_s}{f_k(2^{1/B}-1)} \quad (4)$$

It is not necessary to calculate the coefficients $X^{cq}(k, n)$ at all positions n of the input signal, to adequately reconstruct the input audio signal from the CQT coefficients. Adequate audio signal reconstruction can be obtained by placing successive basis functions $H_k$ samples apart, with values chosen according to $0<H_k\leq N_k/2$.

In order to calculate in an efficient manner the CQT transform coefficients $X^{cq}(k,n)$ as defined by equation (1) at one point n of an input signal x(n) techniques may be used that are described in "An Efficient Algorithm for the Calculation of a Constant Q Transform" by J. C. Brown and M. S. Puckette, J. Acoust. Soc. Am., vol. 92, no. 5, pp. 2698-2701, with regard to step 308 in FIG. 3 and step 1406 in FIG. 14. Rather than directly implementing equation (1), which requires calculating inner products of the input signal with each of the transform bases, a computationally efficient implementation is obtained by utilizing the identity described in equation (5):

$$\sum_{n=0}^{N-1} x(j)a^*(j) = \sum_{j=0}^{N-1} X(j)A^*(j) \quad (5)$$

where X(j) is a discrete Fourier transform (DFT) of x(n) and A(j) is the DFT of a(n). Equation (5) holds for any discrete signals x(n) and a(n).

Using equation (5), the CQT transform defined by equation (1) is rewritten as:

$$X^{cq}(k,N/2) = \sum_{j=0}^{N-1} X(j)A^*_k(j) \quad (6)$$

where $A_k(j)$ is a complex-valued N-point DFT of a transform basis $a_k(n)$ centered at a point N/2 within a transform frame. $A_k(j)$ is referred to as the spectral kernels and $a_k(n)$ is referred to as the temporal kernels.

It has been observed that the spectral kernels $A_k(j)$ are sparse. The summation in (6) can be limited to values near a peak in the spectral kernel to achieve sufficient numerical accuracy and omitting near-zero values in $A_k(j)$. It has also been noted that the summing in equation (6) should be carried out for positive frequencies and followed by a multiplication by two, since it is a symmetric function.

With the spectral kernels $A_k(j)$ stored in a matrix A, the transform in (6) in matrix form is:

$$X^{cq} = A^* X \quad (7)$$

where $A^*$ denotes the conjugate transpose of A. The matrices X and $X^{cq}$ of equation (7) have one column each which contain DFT values $X(j)$ and corresponding CQT coefficients, respectively.

Figure 2B:
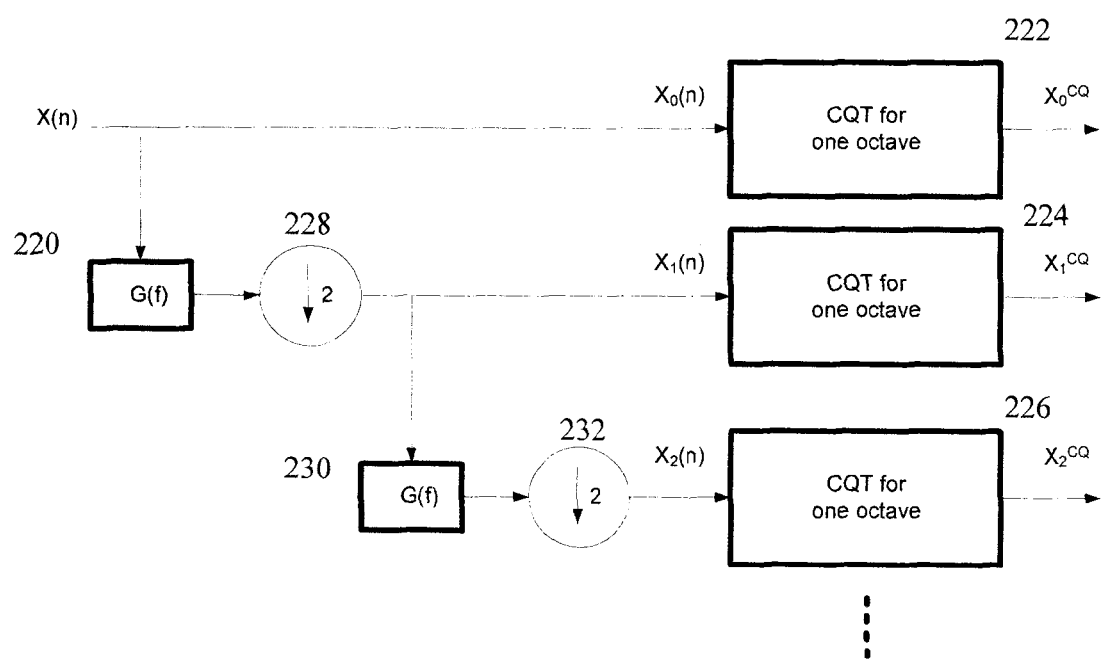
FIG. 2B illustrates an iterative constant Q-factor transform (CQT) coefficient computation based on a single spectral kernel matrix A which produces the CQT for the highest octave.

To avoid long DFT transform blocks, such as may occur when a wide range of audio signal frequencies is processed, a spectral kernel matrix A is chosen which produces a CQT for the highest octave only and is used for CQT coefficient computation for the other octaves of the audio frame. After applying the highest-octave CQT bins over the audio signal, the audio signal is low pass filtered and down sampled by factor two. The same process is then repeated to calculate CQT bins for the next octave, using the same DFT block size and spectral kernel, which is addressed in "Calculation of a Constant Q Spectral Transform" by J. C. Brown, J. Acoust. Soc. Am., vol. 89, no. 1, pp. 425-434, 1991, with regard to step 308 in FIG. 3 and step 1406 in FIG. 14. This process is repeated iteratively until a desired number of octaves has been covered as shown in FIG. 2B. In FIG. 2B, the functions G(f) represent low pass filters and the $\downarrow 2$ symbol represents down sampling by a factor of 2.

The spectral kernel A represents frequency bins that are at maximum one octave apart. Thus, the length of the DFT block can then be made short, according to $N_k$ of the lowest CQT bin. As a result, the matrix A is sparse even for the highest-frequency bins. Successive columns of A containing the DFTs of $a_k(n)$ have been temporally shifted to different locations. These temporally translated versions of the transform bases resulting from generating the $a_k(n)$ within the same spectral kernel matrix A can also be used to improve computational efficiency. Thus, fewer DFT transforms of the input signal x(n) are computed to obtain the DFT spectrum X(j) in (6).

The transform for a single octave, such as indicated by "CQT for one octave" blocks 222, 224, 226 in FIG. 2B is defined next. An input signal, such as an input 1D audio signal, is decimated d times by a factor of two to generate $x_d(n)$. The sampling rate of $x_d(n)$ is $f_s/2^d$. The signal $x_d(n)$ is processed into DFT transform frames of length $N_{DFT}$ and are positioned $H_{DFT}$ samples apart as determined, for example by having successive audio frames overlap by $N_{DFT}-H_{DFT}$ samples. A Fourier transform is then applied to each audio frame using a rectangular window which results in a spectrogram that is stored in a matrix X. Matrix X is configured so that column m contains a complex valued spectrum of frame m for positive frequencies only. The CQT transform $x_d^{cq}$ for this octave d is calculated as:

$$X_d^{cq} = A^* X_d \quad (8)$$

where $A^*$ is a conjugate transpose of the complex-valued spectral kernel matrix for one octave. The above process is repeated for each successive octave, as illustrated in FIG. 2B.

In particular, FIG. 2B illustrates an iterative CQT coefficient computation based on a single spectral kernel matrix A which produces the CQT for the highest octave. FIG. 2B includes an initial set of CQTs for the one octave blocks 222, 224, and 226, an initial set of "G(f)" functions 220 and 230, and an initial set of decimation by a factor of 2 blocks 228 and 232. The kernel remains the same for all octaves. Also, the DFT length $N_{DFT}$ remains the same despite the decimations, allowing the effective FFT length to double after each decimation step. The first octave is computed using signal x0(n), which is identical to the input x(n).

In FIG. 2B, the decimated signals $x_d(n)$ are obtained from $x_{d-1}(n)$ by low pass filtering and down sampling by factor two. Down sampling by factor two is done by removing every second sample of the time-domain signal. There are $2^{D-1}N1$ zeros padded at be beginning of the signal x(n) and $2^{D-1}N_{DFT}$ zeros padded at the end of the signal x(n), where N1 is a window length of the lowest-frequency bin within the one-octave kernel, D is the number of octaves calculated, and $N_{DFT}$ is the length of the DFT frame. Zero padding of the x(n) signal is done before the CQT computations. The results $X_0^{CQ}$, $X_1^{CQ}$, and $X_2^{CQ}$ shown in FIG. 2B represent columns of the CQT coefficient matrix, with regard to step 308 in FIG. 3 and step 1406 in FIG. 14.

Figure 3:
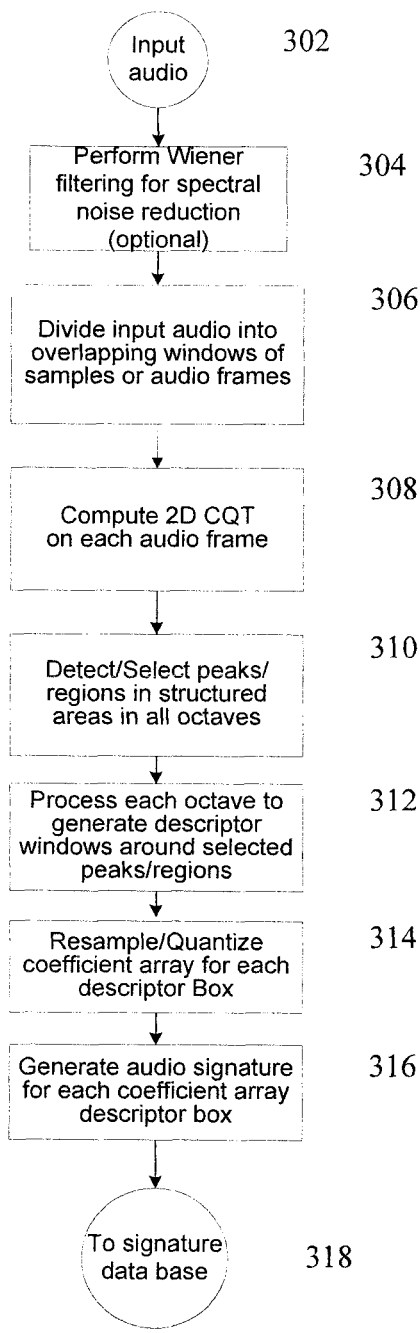
FIG. 3 illustrates an audio fingerprinting process for audio frame pre-processing and analysis for descriptor and signature generation.

As presented in FIG. 3, an advantageous audio fingerprinting process 300 for audio frame preprocessing and analysis for descriptor and signature generation. At step 302, an audio signal is received. At step 304, the input audio sequence is filtered for noise reduction as an optional step. For example, at step 304, a Wiener filter may be applied to the input audio signal for spectral noise reduction. At step 306, the audio sequence is divided into overlapping windows of samples or audio frames. At step 308, a 2D CQT is performed on each overlapped audio frame. At step 310, octaves within the 2D CQT scale-space representation of audio frames are processed for peak, interest region, detection and selection in structured regions determined for each octave. At step 312, CQT coefficients are processed, for example the CQT coefficients around detected peaks may be re-sampled with 2D filters or other transforms, such as DCT transforms. At step 314, descriptor windows are generated as descriptor boxes in a graphical presentation of the descriptors around selected peaks. At step 316, for each descriptor box, an audio signature is generated by applying a quantizer on multidimensional descriptor coefficients. For example, a quantizer threshold is determined experimentally or analytically to determine a binary representation of each dimension of the multidimensional descriptor.

The CQT transforms a 1D time-domain signal x(n) into the 2D time-frequency domain, also referred to as a scale-space domain, so that the center frequencies of frequency bins are geometrically spaced and their Q-factors, ratios of the center frequencies to bandwidths, are constant. As stated above, a conventional DFT has linearly spaced frequency bins. Contrary to the conventional DFT, a CQT's time resolution varies for different frequency bins such that frequency resolution is better for low frequencies and the time resolution is better for high frequencies.

Figure 4:
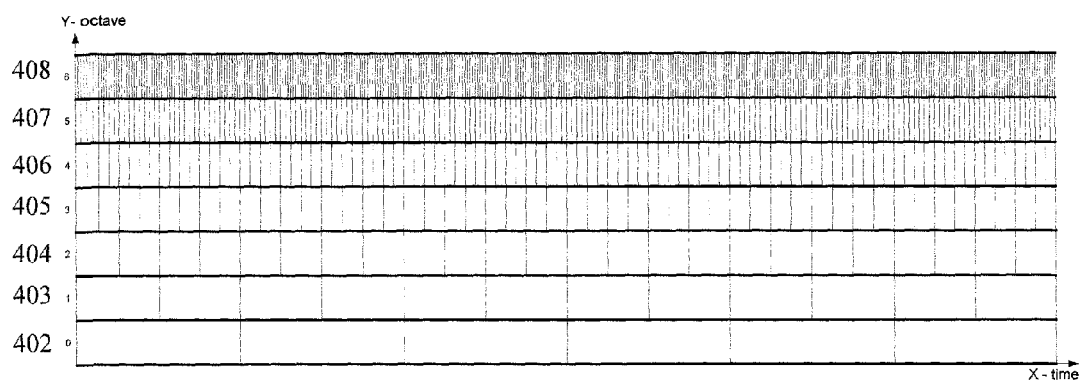
FIG. 4 illustrates an exemplary CQT coefficient 2D data structure having 7 geometrically spaced octaves.

FIG. 4 illustrates a 2D CQT data structure 400 with 7 geometrically spaced octaves 402-408. Note the data structure 400 is not shown to scale. The vertical bars along the x time axis are sample points in each octave. As it is seen from the diagram, the time resolution is lower for lower frequency bins having a longer time between sample points and higher for the higher frequency bins having shorter time between sample points for each octave. For example, octave 402 shows 6 additional vertical bars on the x time axis starting from the x=0 position in time, representing the CQT coefficients. Octave 403 shows 12 additional vertical bars starting from the x=0 position in time, etc., with each octave doubling the number of vertical bars representing the CQT coefficients. Also, since the octaves, and coefficient bins within the octaves, are geometrically spaced (note that geometrical spacing of frequency bins is not shown in FIG. 4), the frequency resolution is higher for lower octaves and lower for higher octaves.

Figure 5:
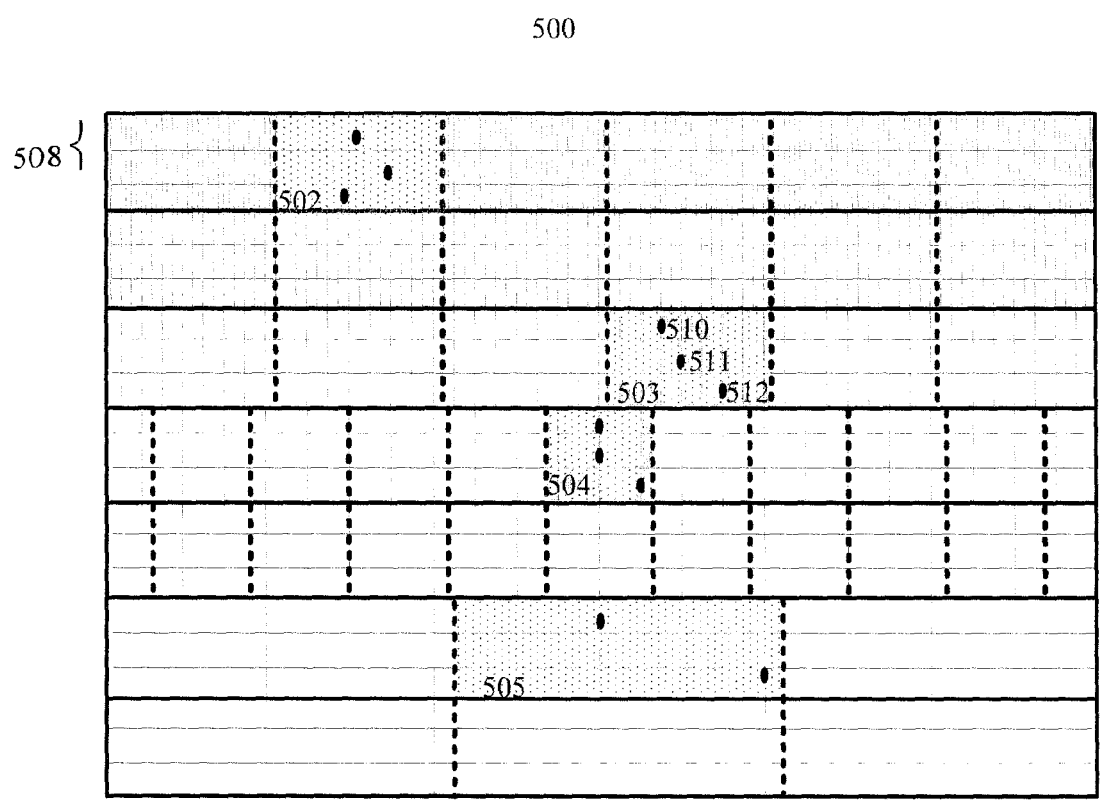
FIG. 5 illustrates an exemplary data structure using scheduled regions per octave for peak coefficient detection.

One way to determine regions of interest within the 2D CQT data structure 400 representing an audio frame, is to tile the 2D data structure 400 into spatial regions localized within the extent of each octave. These tiled spatial regions, an example is shown in FIG. 5, can be used to determine local maxima for groups of coefficients belonging to the same tiled spatial region. The tiled regions can be flexibly, and independently, designed for each octave. A collection of local maxima in each tiled region can be further sorted according to their magnitudes, and the strongest maxima selected as a set of interest points with associated vectors describing their spatial position and the peak intensity. Selected maxima, as a three tuple (x, y, peak-intensity) where x is time, y is frequency, and peak-intensity is a CQT coefficient magnitude, may be further processed to select multiple interest regions per each octave in accordance with various vector component feature criteria.

FIG. 5 illustrates an exemplary data structure 500 using region scheduling per octave for peak coefficient detection. Note the data structure 500 is not to scale. As an example, in FIG. 5, each shaded region 502-505 carries at most three coefficient peaks determined in each of the three horizontally divided sub-regions within each octave, such as octave 508 shown with three horizontally divided sub-regions. Maxima or peaks in each region, such as region 503 having three peaks 510-512, are further sorted according to their magnitudes and a subset with highest magnitude, such as peak 511, may be selected as a central point of an interest region used for descriptor generation.

Descriptor generation based on, for example, a 3×3, 5×5, or the like gradient filter is described next. A number of features with corresponding interest points are detected in the audio signal and selected in interest region processing. These selected interest regions are filtered by a set of filtering rules in order to generate a set of spatial descriptors. For each interest point at a spatial (x, y) position, a rectangular region of predetermined size is drawn.

In another embodiment, FIG. 6A illustrates an exemplary region 600 within an octave with three sub-regions 602-604 used to determine a peak interest point 606-608 for each sub-region. FIG. 6B, illustrates a sub-region 620 determined from the sub-regions 602 of FIG. 6A and having an exemplary vertical rectangular descriptor box 622, centered at an interest point 624 detected for the sub-region 620 and extending vertically across the octave. The rectangular descriptor box 622 with a gradient filter applied in raster fashion is used to generate gradient filter transformed CQT coefficients. FIG. 6C, illustrates a descriptor coefficient matrix 630 obtained after the gradient filter has been applied on coefficients from the region bounded by the vertical rectangular descriptor box 622 around detected interest point 624 of FIG. 6B.

In another embodiment, FIG. 7A illustrates a region 700 within an octave with three sub-regions 702-704 used to determine a peak interest point 706-708 for each sub-region. FIG. 7B illustrates two exemplary horizontal rectangular descriptor boxes 722 and 723, centered around an interest point 724 detected for the sub-region 720. A gradient filter is applied in raster fashion to the two horizontal rectangular descriptor boxes 722 and 723 to generate a single descriptor coefficient matrix 730. FIG. 7C) illustrates a descriptor coefficient matrix 730 obtained after the gradient filter has been applied on coefficients from the two horizontal rectangular descriptor boxes 722 and 723 around detected interest point 724 of FIG. 7B, but not including the interest point 724. The gradient filter is applied separately on each box 722 and 723.

Descriptor and signature generation is based on a method of computing a coefficient intensity gradient vector, for each coefficient in a selected region. FIG. 8A shows an exemplary coefficient intensity gradient vector graph 800 with a 3×3 grid coefficient 802 at position (x,y) and its 8-coefficient neighborhood.

A gradient vector [G(x) G(y)] 804, with its horizontal and vertical components Gx and Gy respectively, is computed for the coefficient 802 with intensity f(x,y) as a partial derivative in the image x and y spatial directions as determined by equation 10:

$$[Gx(x), Gy(y)] = [\partial f(x,y)/\partial x, \partial f(x,y)/\partial y]. \quad (10)$$

FIG. 8B illustrates a 2D gradient filter matrix 830. The partial derivative computation is approximated with a Gx and a Gy operator presented in coefficient intensity gradient matrix approximation of FIGS. 8A and 8B. For example, the intensity f(x,y) is positioned at position e 832 of FIG. 8B which has intensity values [a thru d] and [f thru i] in the surrounding 3×3 coefficient area.

Based on the Gx and Gy operators, a gradient vector intensity for a single coefficient may be computed by equation 11:

$$Gm = \sqrt{[Gx^2 + Gy^2]}. \quad (11)$$

According to step 314 of FIG. 3 and for each resultant re-sampled region, four values may be computed, including a resultant gradient magnitude that is a sum GM of coefficient intensity gradients Gm, a resultant gradient in the spatial x direction that is a sum GX of coefficient Gx components, a resultant gradient in the spatial y direction that is a sum GY of coefficient Gy components, and a resultant sum of gradients in both x and y directions that is a sum Gxy of combined Gx+Gy values computed for each coefficient.

Each set of the values resulting after the gradient filter has been applied, can be directly used for a multidimensional signature generation for the particular interest point in question.

The above description is presented by way of an example. However, the method is general with respect to the initial region size for the interest region detection, block re-sampling grid size, according to a filter size used, and the number of dimensions used for the descriptor generation.

For an interest point (x, y) a rectangular descriptor box is placed on a 2D data structure, in a manner similar to image processing, with a center at the (x, y) interest point and with spatial extent of PxQ, where P and Q factors determine the size of a rectangular neighborhood around the interest point under consideration. The rectangular descriptor box is re-sampled to generate a re-sampled grid with coefficient regions, in accordance with an embodiment of the present invention.

The coefficients contained within each nxn 2D spatial filter areas, where n is the spatial filter size parameter, are combined to produce a re-sampled coefficient grid. This is done by multiplying each of the nxn 2D spatial filter areas' coefficients with a corresponding 2D spatial filter coefficient, summing intensity values in the surrounding area, and dividing the intensity summation by the number of coefficients, for each element of the PxQ box area S. The result of this computation is an MxL re-sampled coefficient matrix.

The MxL re-sampled coefficients, computed for each of the PxQ rectangular boxes drawn around an interest point, are subsequently used to generate a descriptor and, based on this descriptor, a signature for that interest point.

In another embodiment, FIG. 9A illustrates a region 900 within an octave with three sub-regions 902-904 used to determine a peak interest point for each sub-region 902-904 having detected interest points 906-908. FIG. 9B illustrates two exemplary vertically drawn rectangular descriptor boxes 922 and 923, centered around an interest point 924, such as one of the interest points 906 or 907 or 908. A 2D spatial filter is applied in raster fashion to the two vertical rectangular descriptor boxes 922 and 923 to generate re-sampled coefficients. FIG. 9C illustrates a descriptor coefficient matrix 930 obtained after the 2D spatial filter had been applied according to the equation described below, and shown in FIG. 10, on coefficients from the two regions 922 and 923 around the detected interest point 924, but not including the interest point 924. The filtered columns from 922 and 923 are concatenated to form descriptor coefficient matrix 930.

FIG. 10 illustrates an exemplary 3×3 2D spatial filter with coefficients h0-h8 1002 and a 3×3 coefficient area 1003 used to compute a single re-sampled coefficient value Re 1006 according to equation 12. This 3×3 2D spatial filter is applied to the coefficients from the two regions 922 and 923 around the detected interest point 924, but not including the interest point 924.

$$Re = ah_0 + bh_1 + ch_2 + dh_3 + eh_4 + fh_5 + gh_6 + hh_7 + ih_8 \qquad (12)$$

In an embodiment presented in FIG. 11A, a region 1100 within an octave is shown with three sub-regions 1102-1104 that are used to determine a peak interest point 1106-1108 for each sub-region 1102-1104. FIG. 11B illustrate an exemplary vertical rectangular descriptor box 1122 centered at an interest point 1124, such as one of the interest points 1106 or 1107 or 1108. A 2D spatial filter is applied in raster fashion to the vertical rectangular descriptor box 1122 to generate filtered coefficients. FIG. 11C illustrates a descriptor coefficient matrix 1130 obtained after the 2D spatial filter has been applied according to the equation 12, on all selected coefficients from the region around detected interest point 1132, such as interest point 1124.

A compacting transform, such as a DCT transform, can be applied to a region around a selected interest point to provide a new set of coefficients used for descriptor generation. For a single interest point (x, y, peak-magnitude) determined in a region within an octave, a rectangular descriptor box with spatial extent of PxQ, where P and Q factors determine the size of the neighborhood around the interest point under consideration and extending across the entire octave in the y direction, can be placed around the interest point. As an example, the Q parameter represent the number of coefficients within the octave in the y direction while the P parameter may be chosen to form a square area symmetric around the interest point in the x direction for 2D DCT computation. The rectangular descriptor box is re-calculated by using the compacting transform to generate an equal size grid with transformed coefficients. These PxQ transformed coefficients, computed for each of the rectangular boxes drawn around an interest point, such as shown in FIGS. 6B, 7B, 9B, and 11B, are subsequently used to generate a descriptor of length according to the selected PxQ descriptor box, representing that interest point.

Figures 12A, 12B, 12C:
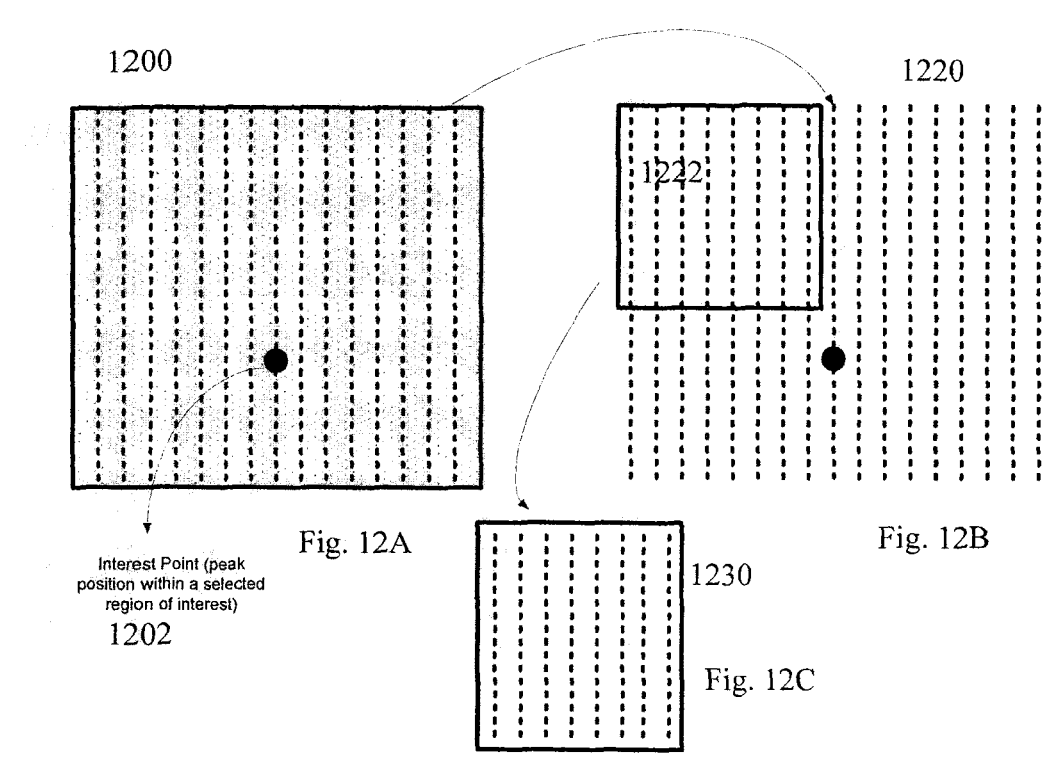
FIG. 12A illustrates a region within an octave used to determine a peak (interest point) for that region.
FIG. 12B illustrates DCT coefficients used for descriptor generation.
FIG. 12C illustrates a descriptor coefficient matrix obtained after a number of lower index DCT coefficients are selected to represent descriptor for that interest point.

In another embodiment, FIG. 12A illustrates a region 1200 within an octave used to determine a peak interest point 1202 for that region 1200. FIG. 12B illustrates DCT coefficients 1220 calculated from a DCT transform applied to the region 1200 to determine the array of transformed coefficients used for descriptor generation. FIG. 12C illustrates a descriptor coefficient matrix 1230 obtained after a number of lower index DCT coefficients 1222 are selected to represent descriptor for that interest point 1202. These descriptor coefficients 1230 are further quantized according to a chosen set of quantization tables to produce a signature representing the same interest point 1202. For example, a simple quantization table may include use of a 2-level magnitude coefficient quantization, with 0 and 1 assigned based on the magnitude coefficient thresholding.

Figure 13:
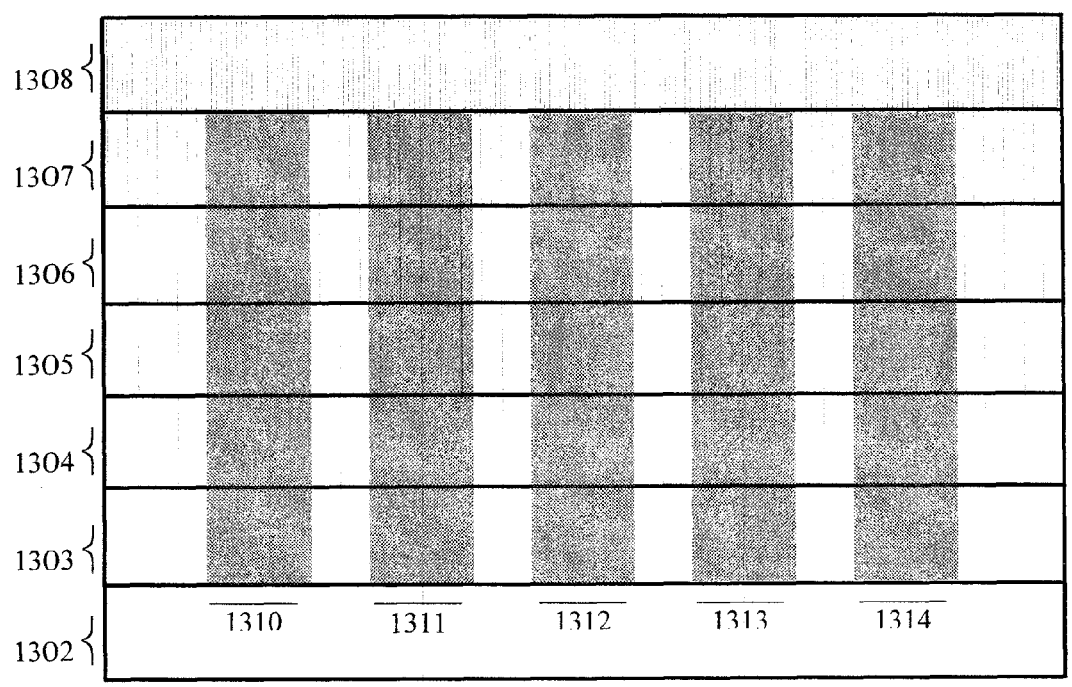
FIG. 13 illustrates a descriptor generation boxes drawn in regular intervals as shaded regions across all or a partial number of octave coefficients.

A compacting transform, such as a DCT transform, can be also used on a set of regularly spaced regions, such as the aforementioned boxes, drawn across one or more octaves in the y direction. No particular coefficient peaks are needed here as described below. A rectangular descriptor box with spatial extent of PxQ extending across the octaves or a subset of octaves, as shown in FIG. 13, is used for descriptor generation. Different number of octaves, different number of frequency bins, and time extent may be selected. In this embodiment, the regions are scheduled at regular intervals, so no peak detection is needed. The rectangular descriptor box is re-computed by using the compacting transform to generate an equal size grid with transformed coefficients. These PxQ transformed coefficients, computed for each of the regularly spaced rectangular boxes, are subsequently used to generate descriptors of length according to the selected PxQ descriptor box.

FIG. 13 illustrates a 2D CQT data structure 1300 with seven geometrically spaced octaves 1302-1308 and descriptor generation boxes 1310-1314 drawn in regular intervals as shaded regions across a partial number of octaves 1303-1307. A DCT is applied on each shaded region to produce transformed coefficient boxes which are further used to produce a descriptor of length according to the selected PxQ descriptor box by selecting a number of lower indexed coefficients to represent descriptors for each shaded region.

The scale-space audio representation as shown in FIG. 13 can be extended by interpolation to form a scale-space image with identical number of coefficient vectors in each octave. Thus, a rectangular, uniform array of CQT coefficients, which may be combined together with interpolated coefficients, as described below, is formed. The interpolated coefficients arranged in a matrix array form can be treated as a digital image frame, and then methods available for digital image feature extraction can be readily applied. One method used in digital image feature extraction is interest region detection based on Gaussian second order partial derivative filters as described in the "Digital Video Content Fingerprinting Based on Scale Invariant Interest Region Detection with an Array of Anisotropic Filters" U.S. application Ser. No. 12/612,729 filed on Nov. 5, 2009, now issued as U.S. Pat. No. 8,189,945 having the same assignee as the present invention and incorporated herein in its entirety. A rectangular descriptor box, drawn around interest regions, and with spatial extent determined based on the scale-space image analysis, may be used for descriptor generation. This rectangular descriptor box may be further re-computed by using a re-sampling method or by using a compacting transform, to generate an equal size grid with transformed coefficients. These transformed coefficients, computed for each of the rectangular descriptor box, are subsequently used to generate feature signatures of arbitrary size.

Figure 14:
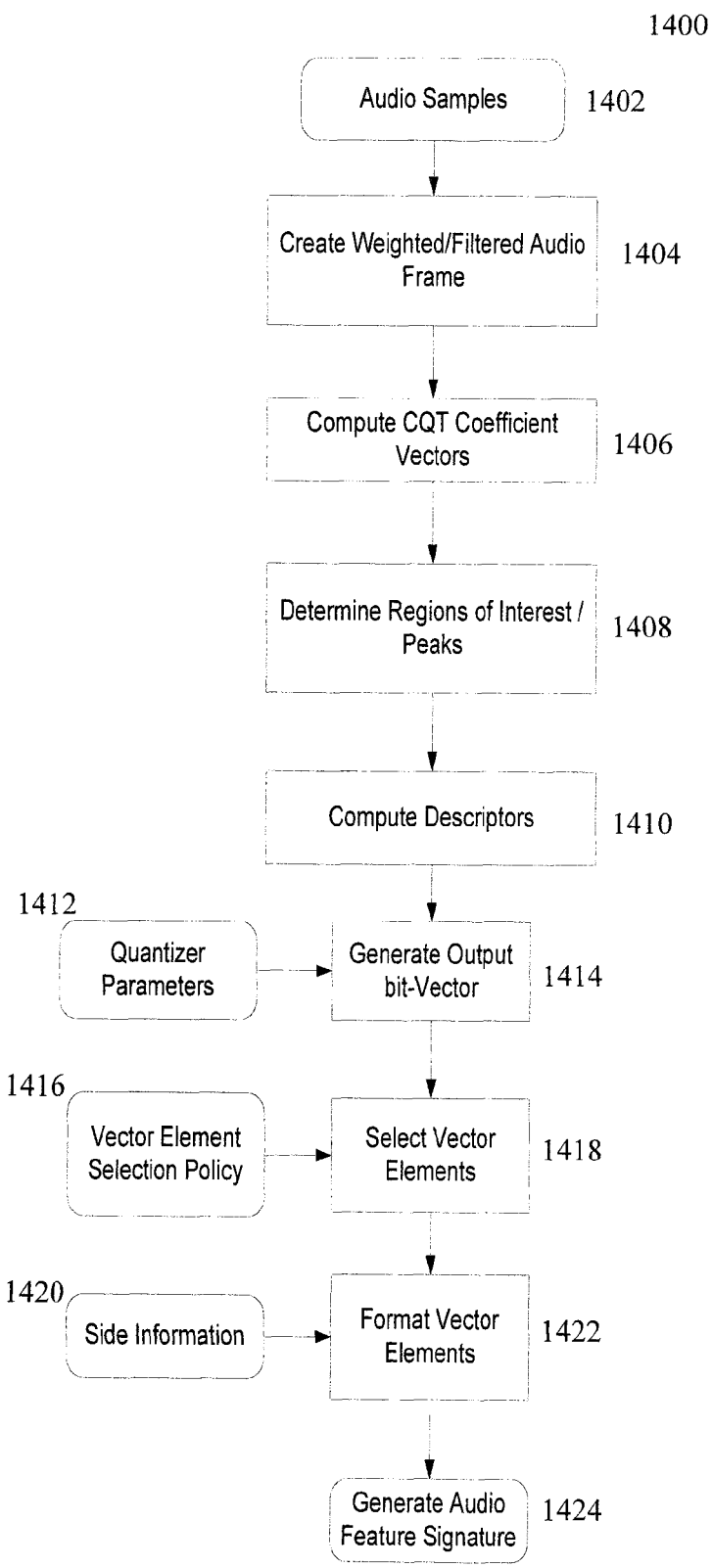
FIG. 14 illustrates an audio fingerprint generation process, including the quantization of descriptor coefficients.

FIG. 14 illustrates an audio fingerprint generation process 1400, including the quantization of descriptor coefficients. At step 1402, audio samples are received for processing. At step 1404, a weighted frame of filtered audio signals is created as illustrated at step 304 in FIG. 3. At step 1406, Constant Q-factor transform (CQT) coefficients arranged in vector form are computed as illustrated in FIG. 2B. At step 1408, regions of peak interest points are determined as illustrated in FIG. 5. At step 1410, descriptors are computed as illustrated in FIGS. 6B and 6C, 7B and 7C, 9B and 9C, 11B and 11C, 12B and 12C, and 13. At step 1414, an output bit-vector is generated based on quantizer parameters, such as threshold values and quantizer tables, accessed at step 1412. At step 1418, vector elements are selected based on a vector element selection policy, such as a balanced distribution of zeros and ones policy, accessed at step 1416. At step 1422, vector elements are formatted based on side information, such as octave and time position side information, accessed at step 1420. At step 1424, an audio feature signature is generated.

The number of bits in a quantized descriptor can be represented by B=ceil(log 2 N), where log 2 is the logarithm base 2, and ceil(x) is the smallest integer greater than or equal to x and N is the number of quantizer levels. In some applications, uniform scalar quantizers may be used. For such an application, the spacing between consecutive quantizer levels is a constant, which is referred to as a quantization step. Thus, to represent a vector of transformed CQT coefficient values for a particular audio frame, each coefficient may be separately quantized with an associated scalar quantizer. The scalar quantizers are adjusted to the dynamic range of each output vector dimension. A quantizer with two levels (N=2) is very useful in reducing the size of an output vector while maintaining relatively high dimensionality. If an audio input is bipolar, the quantizer may encode different levels of the audio signal by the sign of the input.

As described above, for each audio frame the CQT output values are organized as a vector ($c0, \ldots, cN$), with an associated vector of quantizer indices ($q0, \ldots, qN$). In turn, the vector of quantizer indices are represented by a string of bits. In the simplest case, the bits for the indices are concatenated. If quantizer index i (qi) requires Bi bits, then the total number of bits in the bit string is $B=B0+ \ldots +BN$.

When combined with any necessary side information, the resultant bit string is identified as the signature for the audio frame. For an entire audio file or stream, the audio fingerprint is the sequence of audio signatures for the consecutive audio frames in the audio file.

In general, given two signatures ($a0, \ldots, aN$) and ($b0, \ldots, bN$), an L1 distance is computed as:

$$|a0-b0|+ \ldots +|aN-bN| \quad (13)$$

Alternatively, an L2 distance (where L2 is a square root of the sum of squared magnitude differences), or, in general a weighted Lp distance may be computed. If 2-level sign-only quantizers are used, the L1 distance becomes the bit distance between two signatures, which is very simple to compute.

For the case when a compacting transform is used on regions around interest points, as for example use of a DCT transform, the ranges of different coefficients tends to be wider for lower index coefficient indices and frequencies, and more narrow for higher indices and frequencies. Using the same scalar quantizer for all coefficients is often inaccurate and may wastes bits. In general, the range may vary for each quantizer and the number of levels may also vary. For a constant quantization error per coefficient, the quantizer step size may be kept identical for all transform coefficients, and the number of levels per coefficient may vary to get different ranges.

In case when the DCT transformed is used for descriptor formation, it may be useful to ignore the first few coefficients from a transformed coefficient array, since they may not be a reliable measure of the level of the audio signal. For example, the $0^{th}$ coefficient may be ignored, allowing signature matching to be robust to global and local changes in audio level. The low-frequency transform coefficients represent smooth variations over the CQT coefficients, which might not be sufficiently unique and also may be easily changed. Therefore, by ignoring one or more major low-frequency transform coefficients while keeping enough high-frequency coefficients, fingerprint matching has been determined to be more robust.

The method presented in FIG. 14 describes in detail a digital audio 2D representation, interest point and region detection and description which are based on a choice of 2D filters and transforms localized to CQT coefficient formations around regions of interest. An interest point peak detector provides a highly accurate description of coefficient formations in the neighborhood of a detected or selected peak point in the presence of distortions. The method of FIG. 14 allows for robust and precise extraction of audio features resistant to a variety of changes of the audio signal, thus lending itself to accurate digital audio fingerprinting.

Those of skill in the art will appreciate from the present disclosure additional alternative systems and methods for audio descriptor and signature generation, and identification of digital audio sequences in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention. For example, signatures may be also extracted based on temporal evolution of an interpolated scale-space audio representation, analyzed with Haar-Wavelet types of filters at multiple scales. Also, a quantizer maps a continuous-valued function into a set of discrete values, and then associates an integer index with each discrete value. A particular continuous-valued input sample is mapped to the closest discrete value. The discrete values are described as output levels or quantizer levels. The general design problem is to minimize the quantization distortion from the mapping given a certain number N of quantizer levels. Also, in order to index N quantizer levels with binary integers, the number of bits needed to represent the N levels may be determined by selecting a number of lower indexed DCT coefficients.

Another embodiment of the present invention will now be described more fully with reference to the accompanying drawings. These embodiments may, however, be illustrated in various forms and should not be construed as being limited to the embodiments set forth herein. Rather, these embodiments are provided so that this disclosure will be thorough and complete, and will fully convey the scope of the invention to those skilled in the art.

Figure 15:
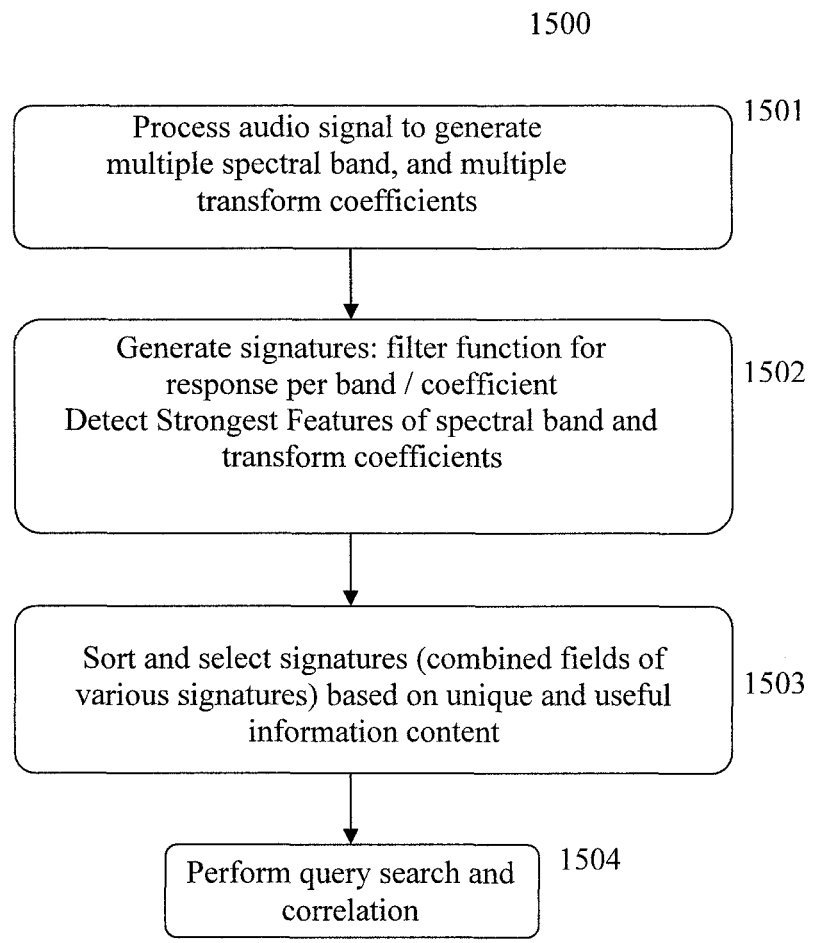
FIG. 15 illustrates a first process for a robust audio identification system that uses multiple features and multiple descriptors and signatures.

FIG. 15 illustrates a first process 1500 for a robust audio identification system that uses multiple features and multiple descriptors and signatures. At step 1501, an incoming audio stream is processed to generate spectral band energy and coefficients of transforms such as linear frequency cepstral coefficients (LFCC) or mel frequency cepstral coefficients (MFCC). At step 1502, the processed spectral band energy values and coefficients are further processed using filtering functions that detect impulse energy per band and coefficient. The calculated impulse energy values are descriptors. Also, at step 1502, signatures are generated by thresholding the calculated impulse energy values. The threshold can be generated by different methods. For example, a simple threshold of "0" may be used as a threshold, or determining an average energy in the available bands or coefficients may be used as a threshold, or determining an optimal value from learning and experimental data may also be used as a threshold, or the like. For example, a threshold value may be generated by dividing the summation of energy in each band by a different value for each band or coefficient. In one approach, the division value may be learned from experimental tests so that more optimal recall results are produced.

Again in step 1502, for each time window for which audio signatures are generated, prominent features are detected. Spectral bands and coefficients that are strongest or among the strongest are identified and utilized to contribute to a hash index for signature access, and for access to associated data to be used during search and correlation.

At step 1503, generated signatures are sorted and selected by ranking them by the useful and unique information for each derived signature. Unique information evaluates distinct features and provides less confusion between the strongest features, while useful information looks at the numbers of zeros and ones in the signatures and hash index. A more useful signature will have a nearly equal balance of ones and zeros and not too many ones or too many zeros. This process 1500 has been verified to actually maximizes the entropy of the selected signatures.

Figure 16:
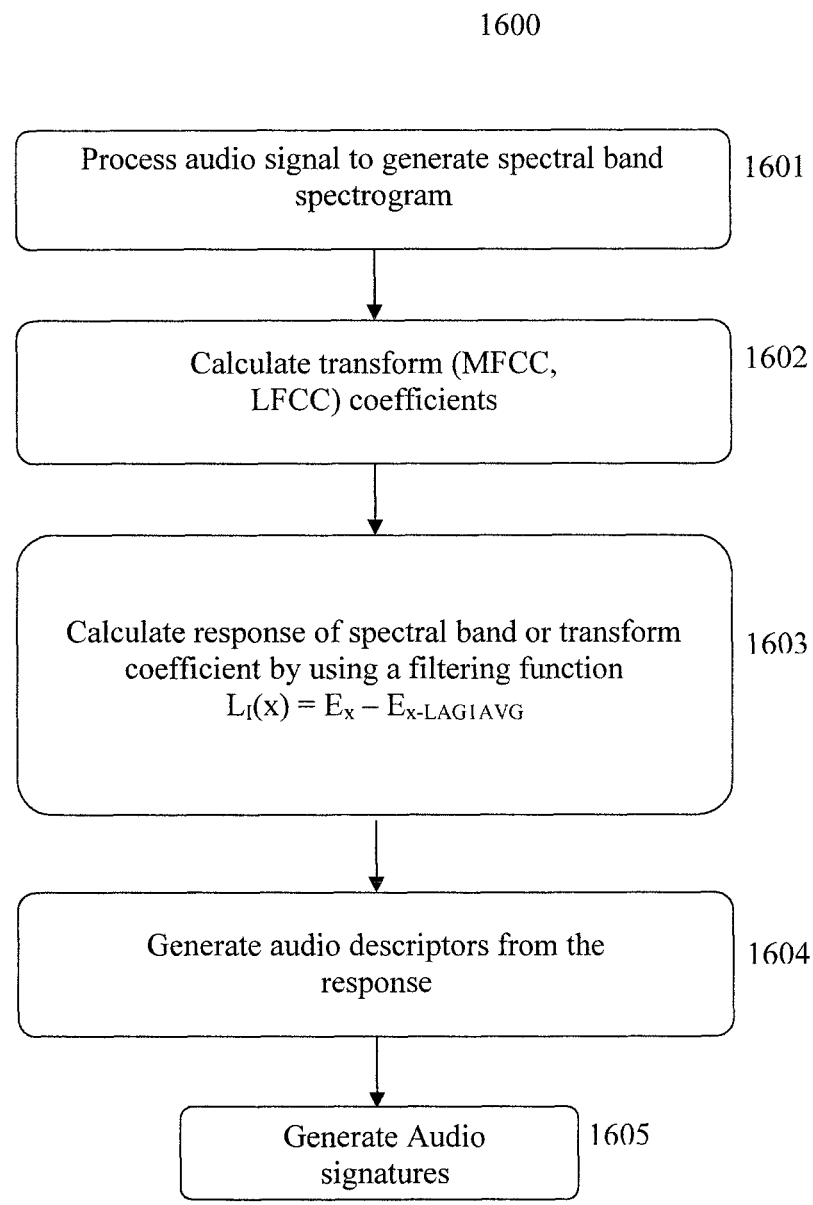
FIG. 16 illustrates a second process for a robust audio descriptor that uses linear frequency cepstral coefficients (LFCC) or mel frequency cepstral coefficients (MFCC) and impulse energy.

FIG. 16 illustrates with another process for a robust audio descriptor that uses LFCC or MFCC and impulse energy. At step 1601, an incoming audio stream is processed to generate spectral band energy. At step 1602, the processed spectral band energy values are computed to transforms such as LFCC or MFCC. At step 1603, a response is calculated for each spectral band and transform coefficient using filtering functions as $L_1(x)=E_x-E_{x-LAG1AVG}$, where $E_x$ is the current descriptor coefficient value at x time window position, $E_{x-LAG1AVG}$ is an average value of the descriptor coefficients to a certain lag1, and $L_1(x)$ is the resulting difference descriptor coefficient.

Figure 17:
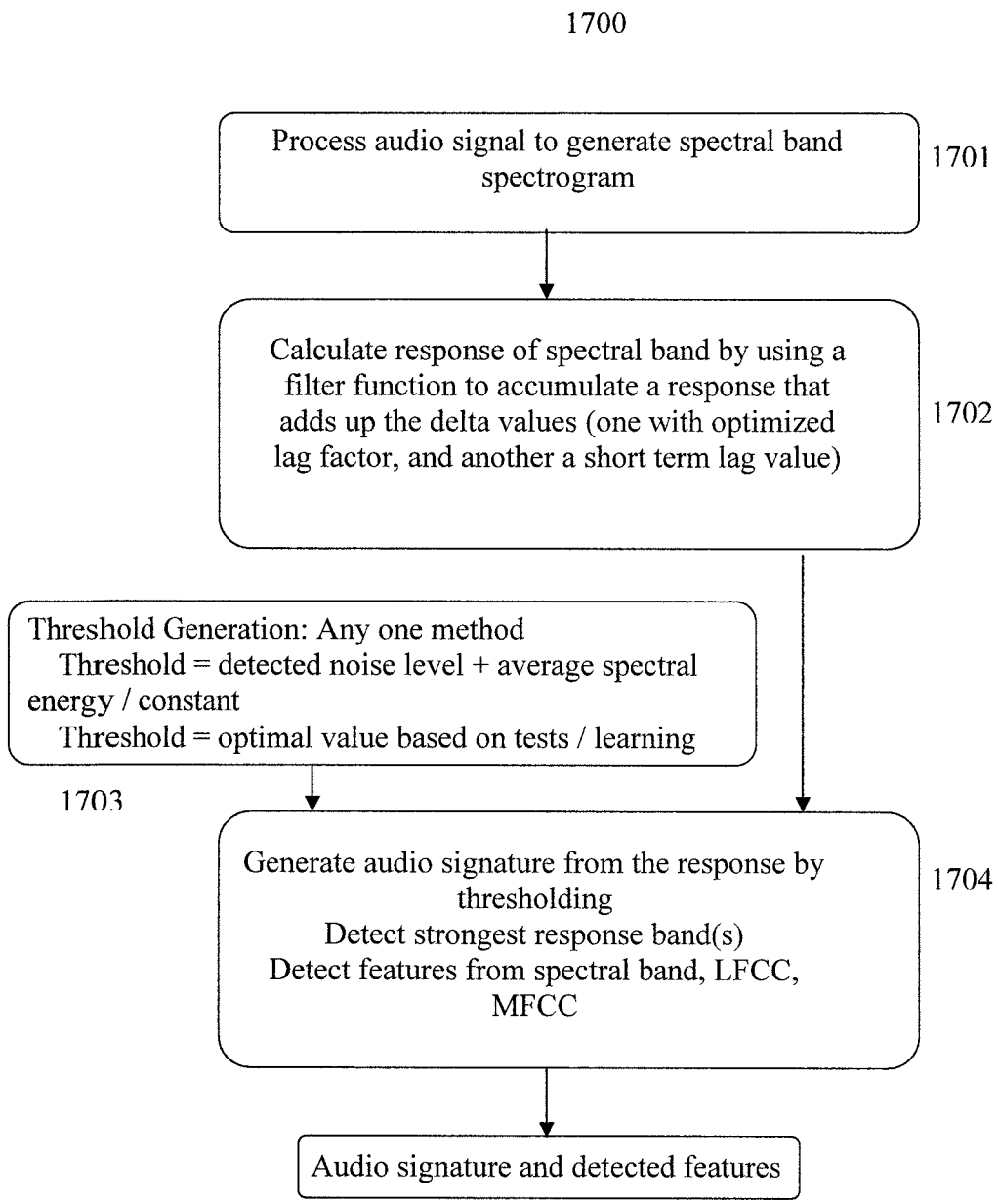
FIG. 17 illustrates a third process for a robust audio feature detector on Log Spectral bands and impulse energy.

FIG. 17 illustrates another process for a robust audio feature detector on log spectral bands and on a response to a filtering function. At step 1701, an incoming audio stream is processed to generate spectral band energy at every time sample. At step 1702, the spectral band energy values are processed using filtering functions that detect the response impulse energy per band. The calculated response values are descriptors. At step 1703, thresholds are generated by any one method. At step 1704, signatures are generated by thresholding the calculated response values.

Step 1703, indicates that the threshold can be generated by various means. For example:
a. a simple threshold of "0".
b. using the average energy in all the bands or coefficients divided by a constant.
c. an optimal value for each band and coefficient from learning and experimental data. An optimal value can be generated by dividing the sum energy in each band by a different value for each band or coefficient. The division value can be learned from experimental tests so that more optimal recall results are produced.
d. detected noise level plus the average spectral energy divided by a constant.

At step 1704, for each time sample for which audio signatures are generated, the prominent features are detected. Spectral bands with impulse energy that is strongest or among the strongest are identified. The identified spectral band's index value is utilized to contribute to hash index for signature access, and for associated data to be used during search and correlation.

FIG. 18 illustrates an audio fingerprint signature 1801 with various components such as an index hash key 1804, associated data unit 1802, and additional associated data per audio signature for fuzzy search unit 1803. The audio fingerprint signature 1801, illustrates an audio signature calculated at a given time. The signature 1801 has a 30 bit coefficient that describe the MFCC or LFCC transform coefficients after thresholding, and a 30 bit band that describe the spectral bands at the same time position after thresholding.

The associated data unit 1802 illustrates associated data that is generated per signature and may include the following fields:
peak spectral band ID after simple or filtering scoring (Band1 ID),
peak coefficient (MFCC or LFCC) after simple or filtering scoring (Coeff1 ID),
next strongest or unique spectral band ID (Band2 ID),
next strongest or unique spectral band ID (coeff2 ID).
An alternate spectral band or coefficient can be selected from the second highest scoring band or coefficient or a next strongest scoring band or coefficient that is sufficiently apart from the strongest band or coefficient.

The additional associated data per audio signature for fuzzy search unit 1803, may also be added to hash key that is used to access the database during search. Assuming Band1 ID1 and Coeff1 ID values are added to the hash index for the reference. Then for a search query, Band1 ID and Coeff1 ID of each query signature will be used as part of the hash key. When interference is present in a query audio signal, the hash key bits and the Band1 ID and or Coeff1 ID values may change in the query. To allow for robust detection, fuzzy search utilizes hash lookups where Band1 ID is substituted by Band2 ID, and similarly for Coeff1 ID. By changing the bits in these fields of the hash signature multiple searches can be conducted to increase the likelihood of finding a primary signature within a cluster of signatures indexed by the hash signature. Various useful combinations that allow for interference in audio are utilized.

A hash index lookup key 1804 is constructed using 16b of the transform coefficient, and 4b of strongest lower LFCC coefficient, and 4b of the strongest upper LFCC coefficient, and 4b of the strongest spectral coefficient.

FIG. 19 illustrates hash key alternatives for use in a fuzzy search method for database access. In FIG. 19, an initial index lookup key, also referred to as a hash key, 1901 contains a first field 12b Coeff, a second field 4b Coeff1 ID, a third field 4b Band ID, and a fourth field 4b Coeff2 ID values which are concatenated to the initial index lookup key for lookup. When interference is present in a query audio signal, the hash key bits and the Band ID and or Coeff1 ID values as in 1901 may change in the query for the audio signal. In another embodiment, the hash bits may be changed to accommodate possible changes in a query which may be due to interference and then repeat the search. In FIG. 19, an index lookup key with a first alternative combination for fuzzy search 1902 contains a first field 12b Coeff, a second field 4b Coeff1 ID, a third field 4b Band ID2, and a fourth field 4b Coeff2 ID. To allow for robust detection, a fuzzy search utilizes hash lookups where Band ID2 substitutes Band1 ID in 1902. In FIG. 19, an index lookup key with a second alternative combination for fuzzy search 1903 contains a first field 12b Coeff, a second field 4b Coeff1 ID2, a third field 4b Band ID2, and a fourth field 4b Coeff2 ID. Similarly in unit 1903, another fuzzy search example shows that the second field 4b Coeff1 ID2 has been substituted for the second field 4b Coeff1 ID shown in 1902, and the third field 4b Band ID2 has been substituted for the 4b Band ID3.

In one embodiment, a fuzzy search method includes a search with a variety of selected signature field combinations to extract likely matches followed by search match likelihood analysis. In another embodiment, signatures are generated by combining different fields of various descriptors. To generate a more robust signature set for speech and adjusting for various source interferences, a select number of field combinations of different descriptors are learned by experiments.

Figure 20:
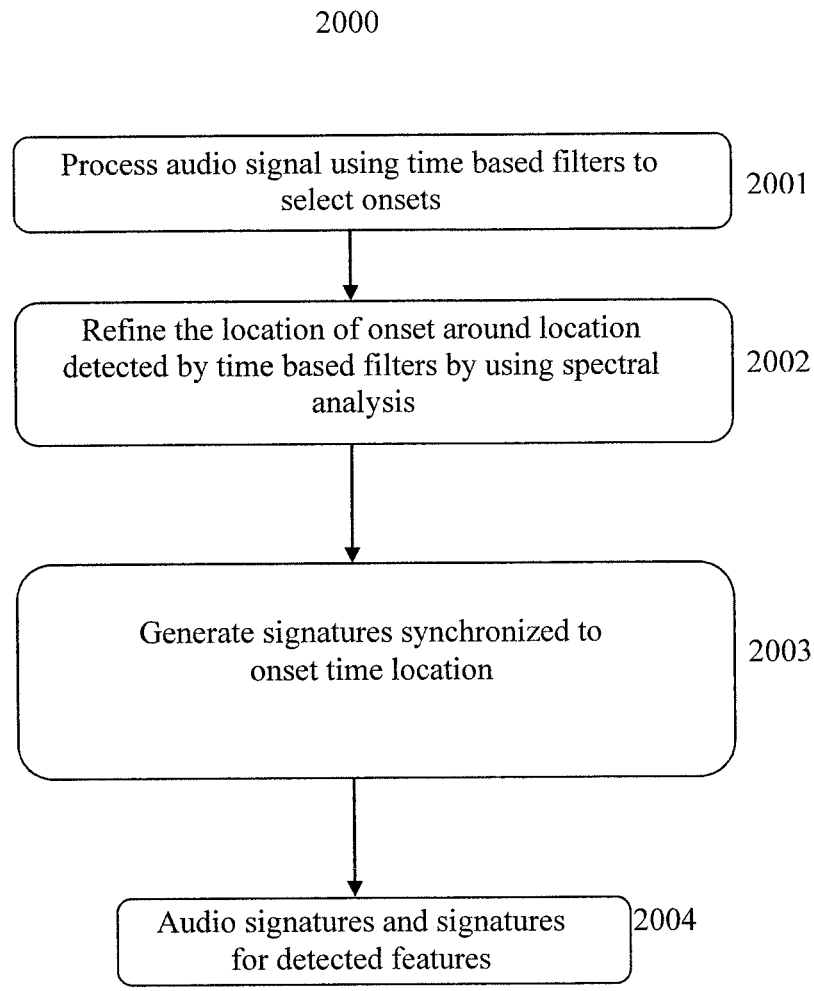
FIG. 20 illustrates a fingerprint method that detects audio signal onset using a two stage filter process, and generate signatures synchronized to onset time, and/or select the periods to generate signatures.

FIG. 20 illustrates a fingerprinting method 2000 that detects audio signal onset using a two stage filter process, and generates signatures synchronized to onset time, and/or select the periods to generate signatures. At step 2001, an incoming audio stream is processed with a first stage time based filter to identify likely time locations for audio onsets. At step 2002, an identified likely time location is further refined by using a second stage time based filter and various spectral analysis. At step 2003 signatures are generated after synchronization to onset time location. Optionally, at step 2003, signatures may be generated only around the detected onsets and the number of signatures depends on the width of a time filter that detected the onset. Thus onsets that last over a wider window generate more signatures. At step 2004, audio signatures and signature for detected features are stored in an audio signature database.

Figure 21:
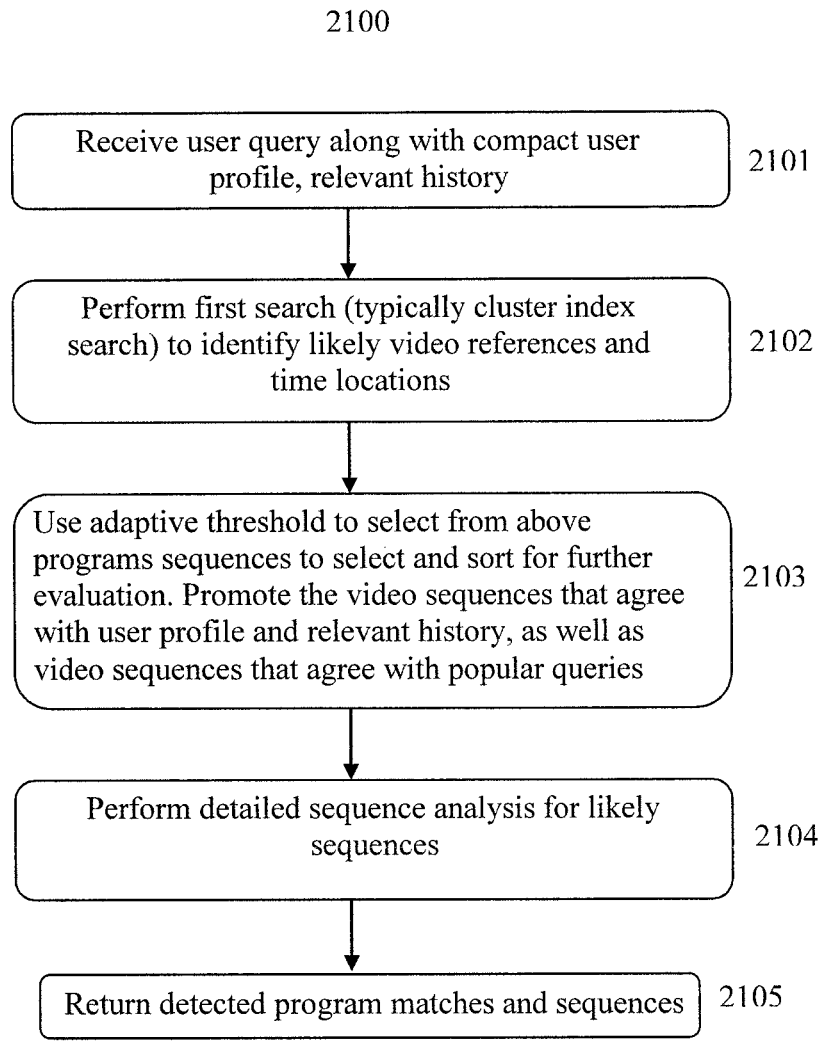
FIG. 21 illustrates a first search method that promotes matches from user history and user profile, and popular video programs.

FIG. 21 illustrates a first search method 2100 that promotes matches from user history and user profile, and popular video programs. At step 2101, an incoming query along with user information such as user profile and relevant user history is received. At step 2102, a first search operation generally using cluster indexes identifies likely matching video programs along with likely time locations. At step 2103, an adaptive threshold process is used to select and sort the likely matching list. The adaptive threshold process at step 2103 is used to promote matches among likely user matches based on user profile and relevant user history. Additionally, a small list of popular video sequences can also be promoted at the threshold step. The end effect of promoting likely matches at step 2103 is an improved identification rate. At step 2104, a detailed sequence analysis for likely matching sequences is performed. At step 2105, the detected program and sequence matches are returned to the user.

Figure 22:
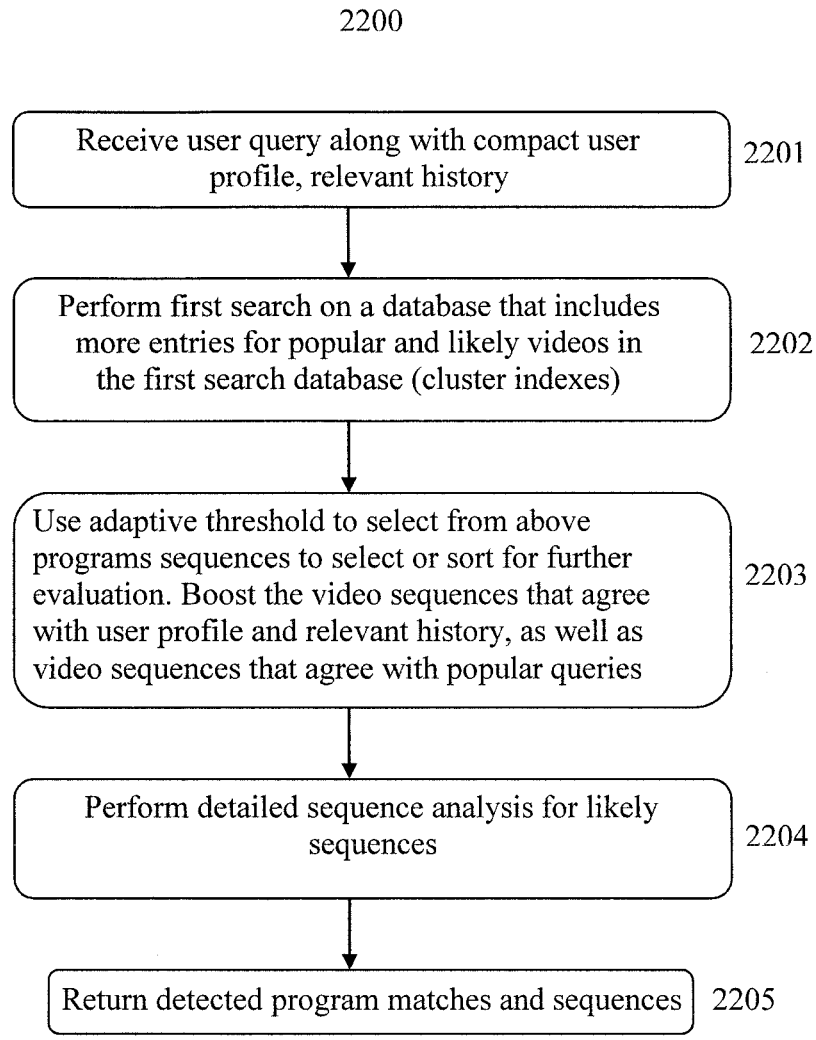
FIG. 22 illustrates a second search method that boosts matches from likely videos, and popular video programs.

FIG. 22 illustrates a second search method 2200 that boosts matches from likely videos, and popular video programs. At step 2201, incoming query along with user information such as user profile and relevant user history is received. At step 2202, first search operations generally using cluster indexes identifies likely matching video programs along with likely time locations. Popular video programs are provided with a better match probability by increasing the number of entries stored at cluster index addresses for the first search operation for these popular programs. At step 2203, an adaptive threshold process is used to select and sort the likely matching list. The adaptive threshold process at step 2203 is used to promote matches among likely user matches based on user profile and relevant user history. The end effect of promoting likely matches at step 2203 is an improved identification rate. At step 2204, a detailed sequence analysis for likely sequences is performed to determine likely matching sequences. At step 2205, the detected program and sequence matches are returned to the user.

While the present invention has been disclosed in a presently preferred context, it will be recognized that the present teachings may be adapted to a variety of contexts consistent with this disclosure and the claims that follow.

We claim:

1. A method for robust fingerprinting of audio signals in a processor, the method comprising:
   structuring a received one dimensional (1D) audio signal into overlapping audio frames;
   applying a constant Q-factor transform (CQT) to the overlapping audio frames to generate a two dimensional (2D) CQT data structure representation of the audio frames;
   processing octaves of the 2D CQT data structure to determine regions of interest within the 2D CQT data structure and peak interest points within selected interest regions;
   generating multidimensional descriptors in windows around the peak interest points;
   applying a quantizer threshold to the multidimensional descriptors to generate audio signatures representing the received 1D audio signal; and
   applying a compacting discrete cosine transform (DCT) on a set of regularly spaced regions generated across one or more octaves in 2D CQT array frequency axes directions, wherein the multidimensional descriptors are generated with a length based on a PxQ descriptor box and on generated DCT coefficients.

2. The method of claim 1, wherein to determine regions of interest within the 2D CQT data structure representation of the audio frames, the 2D CQT data structure is tiled into spatial regions localized within the extent of each octave.

3. The method of claim 2, wherein the tiled spatial regions are processed to determine local maxima for groups of coefficients belonging to the same tiled spatial region.

4. The method of claim 3, wherein a collection of local maxima in each tiled region is sorted according to their magnitudes, and a local maxima having the strongest magnitude is selected in each tiled region as a selected interest point with an associated descriptor describing its spatial position and peak intensity.

5. The method of claim 1 further comprising:
   generating a rectangular descriptor box of predetermined size for each of the peak interest points within the selected interest regions at their associated spatial (x, y) position; and
   generating the multidimensional descriptors in the selected interest regions based on filtering by a set of filtering rules.

6. A method for robust fingerprinting of audio signals in a processor, the method comprising:
   structuring a received one dimensional (1D) audio signal into overlapping audio frames;
   applying a constant Q-factor transform (CQT) to the overlapping audio frames to generate a two dimensional (2D) CQT data structure representation of the audio frames;
   processing octaves of the 2D CQT data structure to determine regions of interest within 2D CQT data structure and peak interest points within selected interest regions;
   generating multidimensional descriptors in windows around the peak interest points;
   applying a quantizer threshold to the multidimensional descriptors to generate audio signatures representing the received 1D audio signal;
   generating a rectangular descriptor box of predetermined size for each of the peak interest points within the selected interest regions at their associated spatial (x, y) position; and
   generating the multidimensional descriptors in the selected interest regions based on filtering by a set of filtering rules, wherein a filtering rule for generating the multidimensional descriptors in the selected interest regions based on filtering is to apply a gradient filter in raster fashion on each rectangular descriptor box to generate gradient filter transformed CQT coefficients.

7. A method for robust fingerprinting of audio signals in a processor, the method comprising:

structuring a received one dimensional (1D) audio signal into overlapping audio frames;

applying a constant Q-factor transform (CQT) to the overlapping audio frames to generate a two dimensional (2D) CQT data structure representation of the audio frames;

processing octaves of the 2D CQT data structure to determine regions of interest within the 2D CQT data structure and peak interest points within selected interest regions;

generating multidimensional descriptors in windows around the peak interest points;

applying a quantizer threshold to the multidimensional descriptors to generate audio signatures representing the received 1D audio signal;

generating a rectangular descriptor box of predetermined size for each of the peak interest points within the selected interest regions at their associated spatial (x, y) position; and generating the multidimensional descriptors in the selected interest regions based on filtering by a set of filtering rules, wherein a filtering rule for generating the multidimensional descriptors in the selected interest regions based on filtering is to apply a 2D spatial filter in raster fashion on each rectangular descriptor box to generate 2D spatial filter transformed CQT coefficients.

8. A method for robust fingerprinting of audio signals in a processor, the method comprising:

structuring a received one dimensional (1D) audio signal into overlapping audio frames;

applying a constant Q-factor transform (CQT) to the overlapping audio frames to generate a two dimensional (2D) CQT data structure representation of the audio frames;

processing octaves of the 2D CQT data structure to determine regions of interest within the 2D CQT data structure and peak interest points within selected interest regions;

generating multidimensional descriptors in windows around the peak interest points;

applying a quantizer threshold to the multidimensional descriptors to generate audio signatures representing the received 1D audio signal;

generating a rectangular descriptor box of predetermined size for each of the peak interest points within the selected interest regions at their associated spatial (x, y) position; and generating the multidimensional descriptors in the selected interest regions based on filtering by a set of filtering rules, wherein a filtering rule for generating the multidimensional descriptors in the selected interest regions based on filtering is to apply a 2D discrete cosine transform (DCT) on each rectangular descriptor box to generate 2D discrete cosine transformed CQT coefficients.

9. A method for robust fingerprinting of audio signals in a processor, the method comprising:

structuring a received one dimensional (1D) audio signal into overlapping audio frames;

applying a constant Q-factor transform (CQT) to the overlapping audio frames to generate a two dimensional (2D) CQT data structure representation of the audio frames;

processing octaves of the 2D CQT data structure to determine regions of interest within the 2D CQT data structure and peak interest points within selected interest regions;

generating multidimensional descriptors in windows around the peak interest points; and applying a quantizer threshold to the multidimensional descriptors to generate audio signatures representing the received 1D audio signal, wherein to determine regions of interest within the 2D CQT data structure representation of the audio frames, the 2D CQT data structure is tiled into spatial regions localized within the extent of each octave, wherein the tiled spatial regions are processed to determine local maxima for groups of coefficients belonging to the same tiled spatial region, wherein a collection of local maxima in each tiled region is sorted according to their magnitudes, and a local maxima having the strongest magnitude is selected in each tiled region as a selected interest point with an associated descriptor describing its spatial position and peak intensity, and wherein a DCT transform is applied to each of the selected interest regions around each of the selected interest points to provide a new set of coefficients for each of the selected interest regions to be used for multidimensional descriptor generation.

10. The method of claim 9, wherein a selected PxQ rectangular region of interest is generated around a selected interest point for 2D DCT computation, wherein Q represents a number of coefficients within an octave in a y frequency direction and P is chosen to form a square area symmetric around the interest point in an x time direction.

11. The method of claim 10, wherein transformed coefficients, computed for each of the selected PxQ rectangular region of interest, are used to generate a multidimensional descriptor of length according to the selected PxQ rectangular region of interest.

12. The method of claim 1, wherein the 2D CQT data structure is extended by interpolation to form a scale-space image with an identical number of coefficient vectors in each octave.

13. The method of claim 12, wherein a rectangular array extended by interpolation of CQT coefficients is treated as a digital image frame and then methods for image feature extraction are used to determine the regions of interest.

14. A method to generate audio signatures in a processor, the method comprising:

receiving a one dimensional (1D) audio signal that has been filtered to reduce noise and organized into weighted frames;

applying a constant Q-factor transform (CQT) to the weighted frames to generate a two dimensional (2D) scale-space representation of the 1D audio signal;

processing the 2D scale-space representation to determine interest regions and peak interest points within selected interest regions;

generating multidimensional descriptors for the selected interest regions;

applying a quantizer to the multidimensional descriptors to generate a first set of audio signatures;

combining side information with the signatures of the first set of audio signatures to generate a processed set of audio signatures representing the received 1D audio signal;

generating a rectangular descriptor box of predetermined size for each of the peak interest points within the selected interest regions at their associated spatial (x, y) position; and generating the multidimensional descriptors in the selected interest regions based on filtering by a set of filtering rules, wherein a filtering rule for generating the multidimensional descriptors in the selected interest regions based on filtering is to apply a gradient filter in raster fashion on each rectangular descriptor box to generate gradient filter transformed CQT coefficients.

15. The method of claim 14, wherein the 2D CQT scale-space representation is processed by filtering to form a scale-space image which is then processed by image feature extraction methods to determine the interest regions.

16. A method for audio identification in a processor that is robust to interfering noise, the method comprising:

applying a filtering function to spectral components of a one dimensional (1D) audio signal to accumulate energy of spectral bands of the 1D audio signal;

generating audio query signatures from measurements of the accumulated energy of spectral bands;

correlating the audio query signatures and unique features with reference audio signatures and features;

calculating a frequency band coefficient filter response by accumulating delta values for a predetermined time window applied to the 1D audio signal; and applying a lag factor to the predetermined time window for difference calculation for frequency band coefficients.

17. The method of claim 16 further comprising:

detecting a strongest response of the filter function to the spectral bands and transform coefficients to determine strong features of the 1D audio signal.

18. The method of claim 17 further comprising:

performing a fuzzy search for query signature using various combinations of the strong features detected from the spectral band.

19. The method of claim 16 further comprising:

adding to each audio signature one or more fields comprising an index of one or more of strongest detected features, wherein the index is a hash key that is used to access the reference audio signatures during search and correlation for audio content identification.

20. The method of claim 16 further comprising:

adding indexes and signatures for likely content based on popularity and real time broadcast at the first stage of search, wherein the additional indexes and signatures for likely content improves the accuracy of matching of the reference content.

21. The method of claim 16 further comprising:

promoting a likely match based on user profile where a likely user content identification is compared against initial signature candidates and likely content per a user profile is promoted so that it has a better chance of surviving a first stage of search and can be evaluated further for actual matching.

22. A computer readable non-transitory medium encoded with computer readable program data and code, the program data and code when executed operable to:

structure a received one dimensional (1D) audio signal into overlapping audio frames;

apply a constant Q-factor transform (CQT) to the overlapping audio frames to generate a two dimensional (2D) CQT data structure of the audio frames;

process octaves of the 2D CQT data structure to determine regions of interest within the 2D CQT data structure and peak interest points within selected interest regions;

generate multidimensional descriptors in windows around the peak interest points; and apply a quantizer threshold to the multidimensional descriptors to generate audio signatures representing the receive 1D audio signal; and applying a compacting discrete cosine transform (DCT) on a set of regularly spaced regions generated across one or more octaves in 2D CQT array frequency axes directions, wherein the multidimensional descriptors are generated with a length based on a PxQ descriptor box and on generated DCT coefficients.

23. The computer readable medium of claim 22, wherein the 2D CQT data structure is processed by filtering to form a scale-space image which is then processed by image feature extraction methods to determine the selected interest regions.

24. A method to generate audio signatures in a processor, the method comprising:

receiving a one dimensional (1D) audio signal that has been filtered to reduce noise and organized into weighted frames;

applying a constant Q-factor transform (CQT) to the weighted frames to generate a two dimensional (2D) scale-space representation of the 1D audio signal;

processing the 2D scale-space representation to determine interest regions and peak interest points within selected interest regions;

generating multidimensional descriptors for the selected interest regions;

applying a quantizer to the multidimensional descriptors to generate a first set of audio signatures;

combining side information with the signatures of the first set of audio signatures to generate a processed set of audio signatures representing the received 1D audio signal;

generating a rectangular descriptor box of predetermined size for each of the peak interest points within the selected interest regions at their associated spatial (x, y) position; and generating the multidimensional descriptors in the selected interest regions based on filtering by a set of filtering rules, wherein a filtering rule for generating the multidimensional descriptors in the selected interest regions based on filtering is to apply a 2D spatial filter in raster fashion on each rectangular descriptor box to generate 2D spatial filter transformed CQT coefficients.

25. A method to generate audio signatures in a processor, the method comprising:

receiving a one dimensional (1D) audio signal that has been filtered to reduce noise and organized into weighted frames;

applying a constant Q-factor transform (CQT) to the weighted frames to generate a two dimensional (2D) scale-space representation of the 1D audio signal;

processing the 2D scale-space representation to determine interest regions and peak interest points within selected interest regions;

generating multidimensional descriptors for the selected interest regions;

applying a quantizer to the multidimensional descriptors to generate a first set of audio signatures;

combining side information with the signatures of the first set of audio signatures to generate a processed set of audio signatures representing the received 1D audio signal;

generating a rectangular descriptor box of predetermined size for each of the peak interest points within the selected interest regions at their associated spatial (x, y) position; and generating the multidimensional descriptors in the selected interest regions based on filtering by a set of filtering rules, wherein a filtering rule for generating the multidimensional descriptors in the selected interest regions based on filtering is to apply a 2D discrete cosine transform (DCT) on each rectangular descriptor box to generate 2D discrete cosine transformed CQT coefficients.

* * * * *